US012087985B2

(12) United States Patent
Naito

(10) Patent No.: US 12,087,985 B2
(45) Date of Patent: Sep. 10, 2024

(54) FUEL CELL STACK AND METHOD OF PRODUCING FUEL CELL STACK

(71) Applicant: HONDA MOTOR CO., LTD., Tokyo (JP)

(72) Inventor: Hideharu Naito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 390 days.

(21) Appl. No.: 17/531,002

(22) Filed: Nov. 19, 2021

(65) Prior Publication Data

US 2022/0166047 A1 May 26, 2022

(30) Foreign Application Priority Data

Nov. 24, 2020 (JP) ................................. 2020-194372

(51) Int. Cl.
*H01M 8/24* (2016.01)
*H01M 8/1004* (2016.01)
*H01M 8/2404* (2016.01)
*H01M 8/2475* (2016.01)
*H01M 8/248* (2016.01)

(52) U.S. Cl.
CPC ....... *H01M 8/2475* (2013.01); *H01M 8/1004* (2013.01); *H01M 8/2404* (2016.02); *H01M 8/248* (2013.01)

(58) Field of Classification Search
CPC ............. H01M 8/2475; H01M 8/2404; H01M 8/2484; H01M 8/2485; H01M 8/241; H01M 8/248; H01M 8/1004
See application file for complete search history.

(56) References Cited

U.S. PATENT DOCUMENTS

| | | | |
|---|---|---|---|
| 2010/0028742 A1* | 2/2010 | Jeon ...................... | H01M 8/242 429/465 |
| 2012/0251918 A1* | 10/2012 | Morimoto ........... | H01M 8/2483 429/482 |
| 2014/0147769 A1 | 5/2014 | Takeyama | |
| 2016/0013508 A1 | 1/2016 | Martinchek et al. | |
| 2018/0226663 A1* | 8/2018 | Ishida ................. | H01M 8/0258 |

FOREIGN PATENT DOCUMENTS

| | | |
|---|---|---|
| JP | 2013-012325 A | 1/2013 |
| JP | 2013-152807 A | 8/2013 |
| JP | 2014-212090 A | 11/2014 |
| JP | 2016-018783 A | 2/2016 |

* cited by examiner

*Primary Examiner* — Raymond Alejandro

(74) *Attorney, Agent, or Firm* — Carrier, Shende & Associates P.C.; Joseph P. Carrier; Fulchand P. Shende

(57) ABSTRACT

In a fuel cell stack, a plurality of projections are provided on a surface of a first end plate opposite to a cell stack body. The projections have support surfaces oriented in a stacking direction. The plurality of projections are overlapped with, or adjacent to the flow field seal as viewed in the stacking direction, and the support surfaces of the plurality of projections are positioned on a single plane surface perpendicular to the stacking direction.

19 Claims, 15 Drawing Sheets

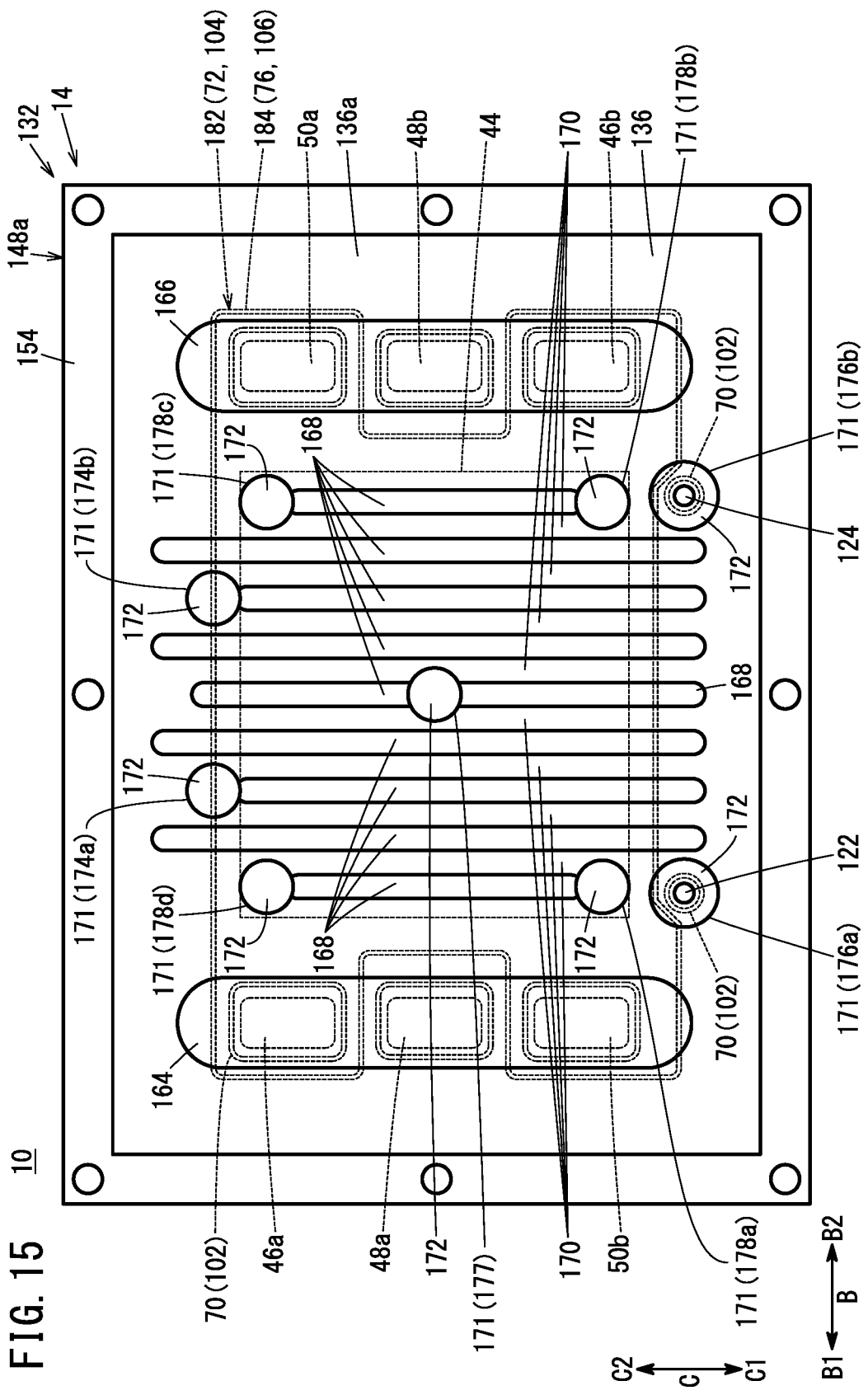

FUEL CELL STACK AND METHOD OF PRODUCING FUEL CELL STACK

CROSS-REFERENCE TO RELATED APPLICATIONS

This application is based upon and claims the benefit of priority from Japanese Patent Application No. 2020-194372 filed on Nov. 24, 2020, the contents of which are incorporated herein by reference.

BACKGROUND OF THE INVENTION

Field of the Invention

The present invention relates to a fuel cell stack and a method of producing the fuel cell stack.

Description of the Related Art

For example, a fuel cell stack includes a cell stack body formed by stacking a plurality of power generation cells together, and a pair of end plates provided at both ends of the cell stack body. Each of the power generation cells includes a membrane electrode assembly (MEA) and separator members provided on both sides of the MEA. The MEA includes an electrolyte membrane, and electrodes provided on both sides of the electrolyte membrane.

In the fuel cell stack of this type, it is required to reliably apply pressure to the plurality of power generation cells that are stacked together to hold the plurality of power generation cells, for preventing increase in the internal resistance of the power generation cells, and/or decrease in the seal performance of reactant gases (a fuel gas and an oxygen-containing gas). For example, JP 2014-212090 A discloses a method of producing a fuel cell stack in which a cell stack body is pressed toward one of end plates using a pressure applying apparatus to apply a compression load to the cell stack body.

SUMMARY OF THE INVENTION

In this regard, a separator member may include a separator body in the form of a metal plate, and the separator body may be provided with a flow field seal. The flow field seal extends around a power generation area to prevent leakage of a reactant gas. The flow field seal includes a seal bead formed integrally with the separator body and protruding from the separator body. When a compression load is applied to the cell stack body, the seal bead of the flow field seal is deformed elastically.

In the case of pressing the cell stack body toward one of end plates at the time of producing the fuel cell stack of this type, as viewed in a stacking direction, a relatively large reaction force from the cell stack body (restoration force of the elastically deformed seal bead) is applied to the one of the end plates at a position overlapped with the flow field seal. Under the circumstances, the end plate may be deformed by the reaction force from the cell stack body.

Further, the separator body may be provided with flow field ridges. The flow field ridges are formed integrally with the separator body, and protrude toward the power generation area to form a reactant gas flow field for supplying a reactant gas to the power generation area. When a compression load is applied to the cell stack body, the flow field ridges are deformed elastically.

In the case of pressing the cell stack body toward one of end plates at the time of producing the fuel cell stack of this type, as viewed in a stacking direction, a relatively large reaction force from the cell stack body (restoration force of the elastically deformed flow field ridges) is applied to the one of the end plates at a position overlapped with the power generation area. Under the circumstances, the end plate may be deformed by the reaction force from the cell stack body.

If the thickness of the end plate is increased as a whole to prevent deformation due to the above described reaction force, the weight and the size of the fuel cell stack are increased undesirably.

The present invention has been made taking the above problem into consideration, and an object of the present invention is to provide a fuel cell stack and a method of producing the fuel cell stack in which it is possible to achieve size reduction and weight reduction, and suppress deformation of the end plate when a compression load is applied to a cell stack body.

According to a first aspect of the present invention, a fuel cell stack is provided. The fuel cell stack includes a cell stack body including a plurality of stacked power generation cells, the power generation cells each including a membrane electrode assembly and separator members disposed on both sides of the membrane electrode assembly, the membrane electrode assembly including an electrolyte membrane and electrodes disposed on both sides of the electrolyte membrane, and an end plate configured to cover the cell stack body from a stacking direction in which the plurality of power generation cells are stacked together, a compression load being applied to the cell stack body in the stacking direction, wherein the separator member includes a separator body in a form of a metal plate, the separator body is provided with a flow field seal configured to extend around a power generation area of the membrane electrode assembly and prevent leakage of a reactant gas, the flow field seal includes a seal bead formed integrally with the separator body and protruding from the separator body in a manner that the seal bead is deformed elastically by the compression load, a plurality of projections having support surfaces oriented in the stacking direction are provided on a surface of the end plate opposite to the cell stack body, the plurality of projections are provided at positions that are overlapped with, or adjacent to the flow field seal as viewed in the stacking direction, and the support surfaces of the plurality of projections are positioned on a single plane surface perpendicular to the stacking direction.

According to a second aspect of the present invention a fuel cell stack is provided. The fuel cell stack includes a cell stack body including a plurality of stacked power generation cells, the power generation cells each including a membrane electrode assembly and separator members disposed on both sides of the membrane electrode assembly, the membrane electrode assembly including an electrolyte membrane, and electrodes disposed on both sides of the electrolyte membrane, and an end plate configured to cover the cell stack body from a stacking direction in which the plurality of power generation cells are stacked together, a compression load being applied to the cell stack body in the stacking direction, wherein the separator member includes a separator body in a form of a metal plate, the separator body is provided with a flow field ridge, the flow field ridge being formed integrally with the separator body, and protruding toward the power generation area to form a reactant gas flow field configured to supply a reactant gas to the power generation area of the membrane electrode assembly, a plurality of projections are formed on a surface of the end plate opposite to the cell stack body, the plurality of projections having support surfaces oriented in the stacking direction, the plurality of projections are provided at positions that are overlapped with, or adjacent to the power generation area as viewed in the stacking direction, and the support surfaces of the plurality of projections are positioned on a single plane surface perpendicular to the stacking direction.

According to a third aspect of the present invention, a method of producing a fuel cell stack is provided. The fuel cell stack is the fuel cell stack as described above. The method includes setting the end plate in a state where the surface of the end plate is oriented downward, in a manner that the support surfaces of the plurality of projections contact a pressure receiving surface of a support jig of a pressure applying apparatus, stacking the plurality of power generation cells on the end plate to form the cell stack body, pressing the cell stack body toward the end plate by a pressing member of the pressure applying apparatus, and disposing another end plate in addition to the end plate, on a side of the cell stack body opposite to the end plate in a manner that the compression load is applied to the cell stack body.

In the present invention, at the time of applying the compression load to the cell stack body, in the state where the support surfaces of the plurality of projections formed on the end plate are brought into contact with the pressure receiving surface of the support jig of the pressure applying apparatus, it is possible to press the cell stack body toward the end plate. In this manner, since it is possible to efficiently receive the reaction force applied from the flow field seal or the power generation area of the cell stack body to the end plate by the pressure receiving surface of the support jig through the plurality of projections, it is possible to suppress deformation of the end plate. Further, in this case, since there is no need to produce the end plate to have a large thickness as a whole, it is possible to reduce the size and the weight of the fuel cell stack.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 15 is a plan view showing a first case member according to a modified embodiment, as viewed from a side opposite to the stack body.

DESCRIPTION OF THE INVENTION

Hereinafter, a preferred embodiment of a fuel cell stack and a method of producing the fuel cell stack according to the present invention will be described with reference to the accompanying drawings.

For example, a fuel cell stack 10 according to an embodiment of the preset invention is mounted in a fuel cell vehicle such as a fuel cell electric vehicle (not shown). It should be noted that the fuel cell stack 10 may be used in stationary applications.

Figure 1:
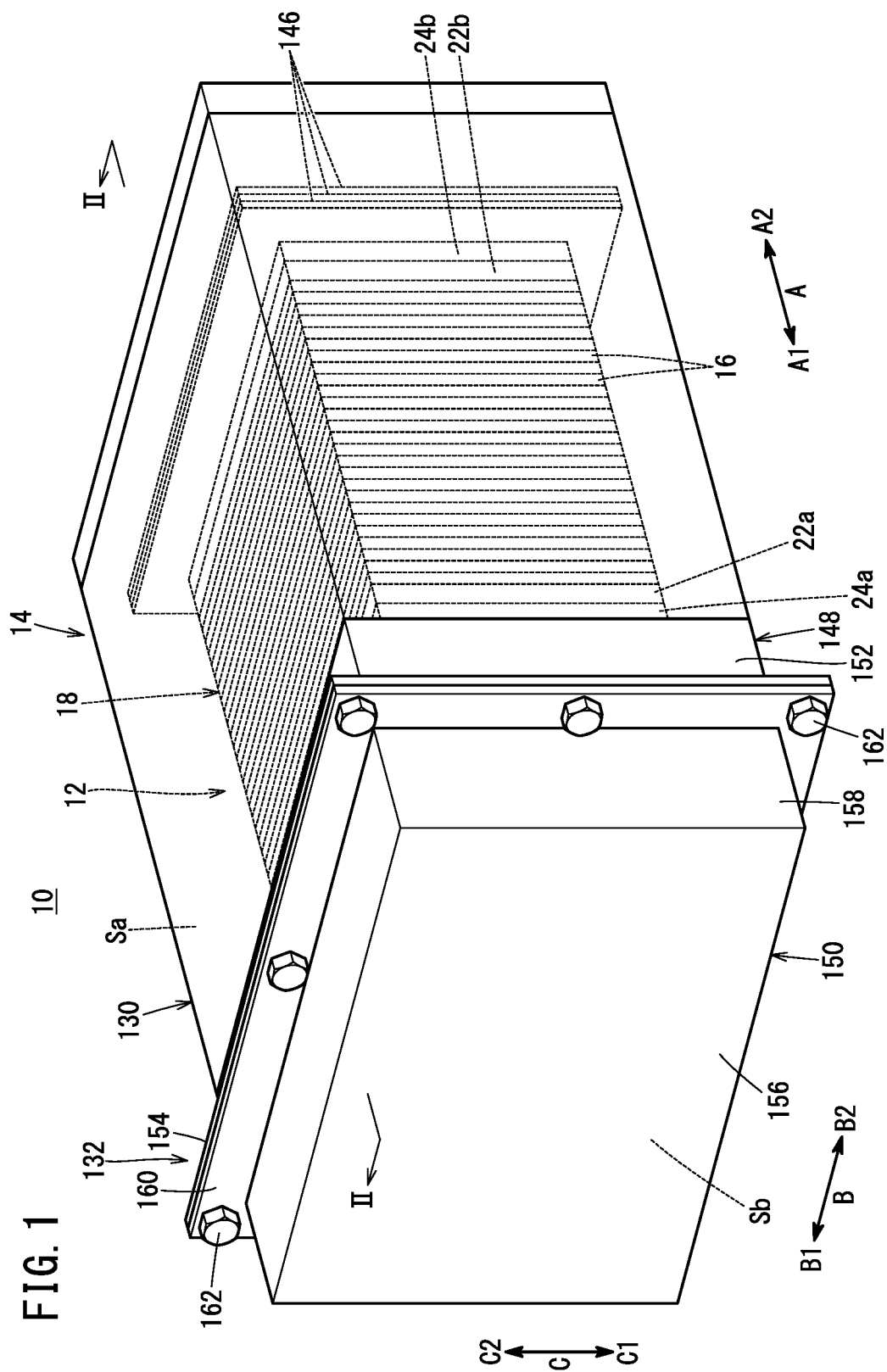
FIG. 1 is a perspective view showing a fuel cell stack according to one embodiment of the present invention.
Figure 2:
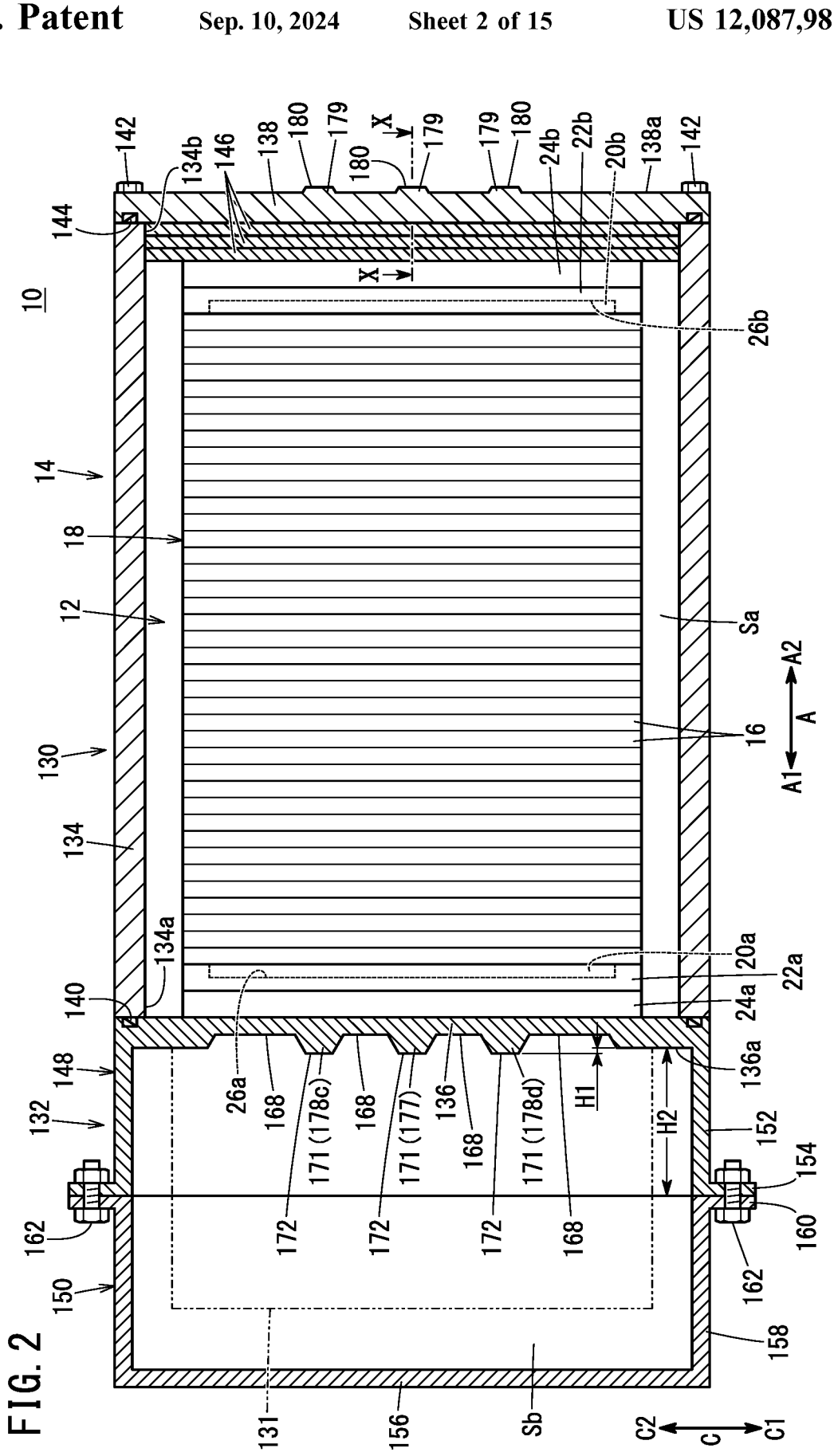
FIG. 2 is a vertical cross sectional view taken along a line II-II in FIG. 1.

As shown in FIGS. 1 and 2, the fuel cell stack 10 includes a stack body 12, and a case unit 14. The stack body 12 includes a cell stack body 18 formed by stacking a plurality of power generation cells 16 together. The fuel cell stack 10 is disposed in a manner that the direction in which the plurality of power generation cells 16 are stacked together (direction indicated by an arrow A) is oriented horizontally.

In FIG. 2, at one end of the cell stack body 18 in the stacking direction (end in the direction indicated by an arrow A1), a first terminal plate 20a is disposed. A first inner insulating plate 22a is disposed outside the first terminal plate 20a, and a first outer insulating plate 24a is disposed outside the first inner insulating plate 22a in the direction indicate by the arrow A1. At the other end of the cell stack body 18 (end in the direction indicated by an arrow A2), a second terminal plate 20b is provided. A second inner insulating plate 22b is disposed outside the second terminal plate 20b, and a second outer insulating plate 24b is disposed outside the second inner insulating plate 22b in the direction indicated by the arrow A2. The stack body 12 includes the cell stack body 18, the first terminal plate 20a, the first inner insulating plate 22a, the first outer insulating plate 24a, the second terminal plate 20b, the second inner insulating plate 22b, and the second outer insulating plate 24b.

Each of the first terminal plate 20a and the second terminal plate 20b is made of electrically conductive material (e.g., metal material such as copper and/or aluminum). Each of the first inner insulating plate 22a and the second inner insulating plate 22b is made of, e.g., electrically insulating resin material to have a rectangular shape (quadrangular shape).

Figure 4:
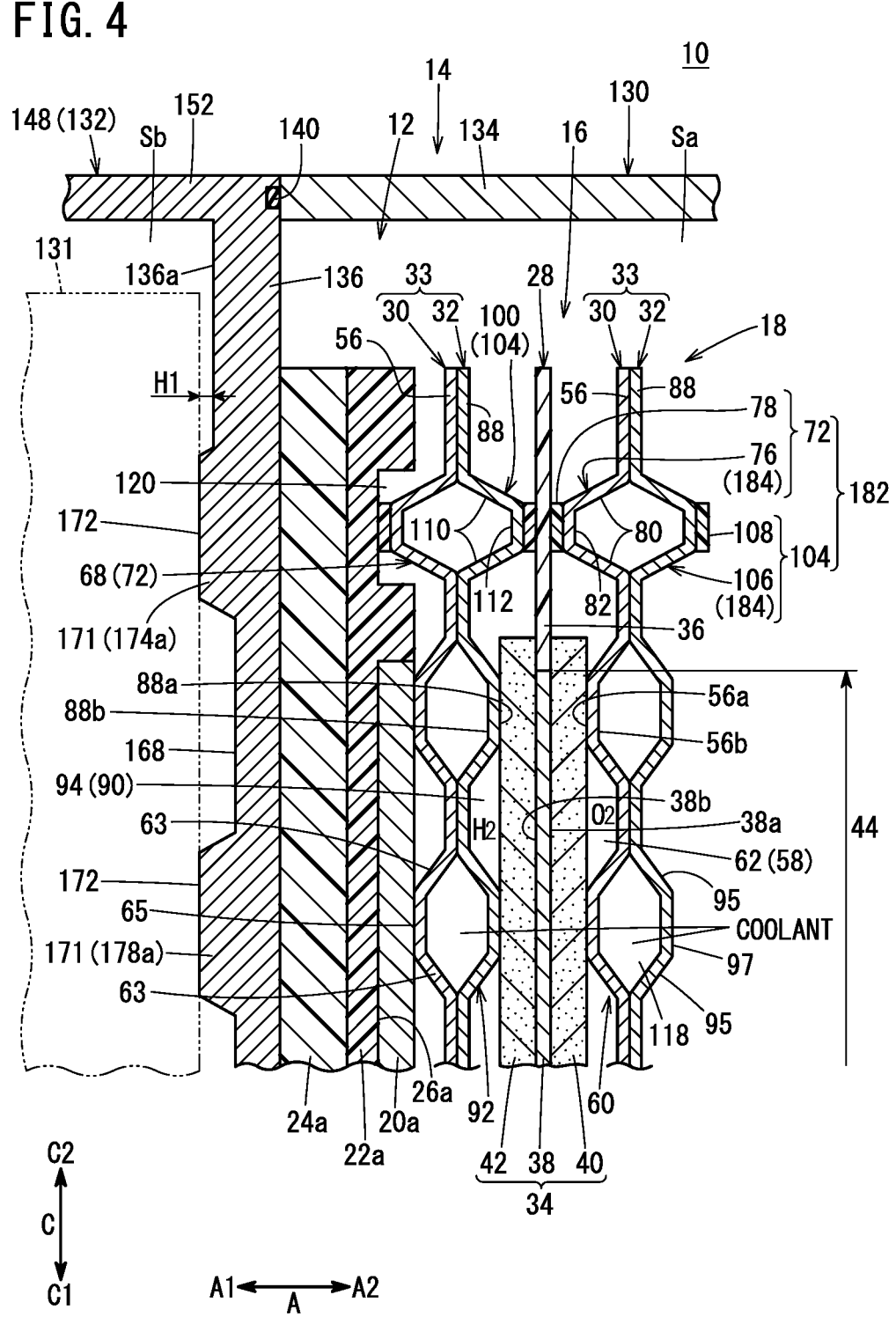
FIG. 4 is an enlarged cross sectional view with partial omission showing the fuel cell stack taken along a line IV-IV in FIG. 3.

A first recess 26a is formed on an inner surface of the first inner insulating plate 22a facing the cell stack body 18 (surface in the direction indicated by the arrow A2). The first terminal plate 20a is provided in the first recess 26a (FIG. 4). A second recess 26b is formed on an inner surface of the second inner insulating plate 22b facing the cell stack body 18 (surface in the direction indicated by the arrow A1). The second terminal plate 20b is provided in the second recess 26b. Each of the first outer insulating plate 24a and second outer insulating plate 24b is made of, e.g., electrically insulating resin material to have a rectangular shape (quadrangular shape). The first inner insulating plate 22a and the first outer insulating plate 24a may be formed integrally. The second inner insulating plate 22b and the second outer insulating plate 24b may be formed integrally.

Figure 3:
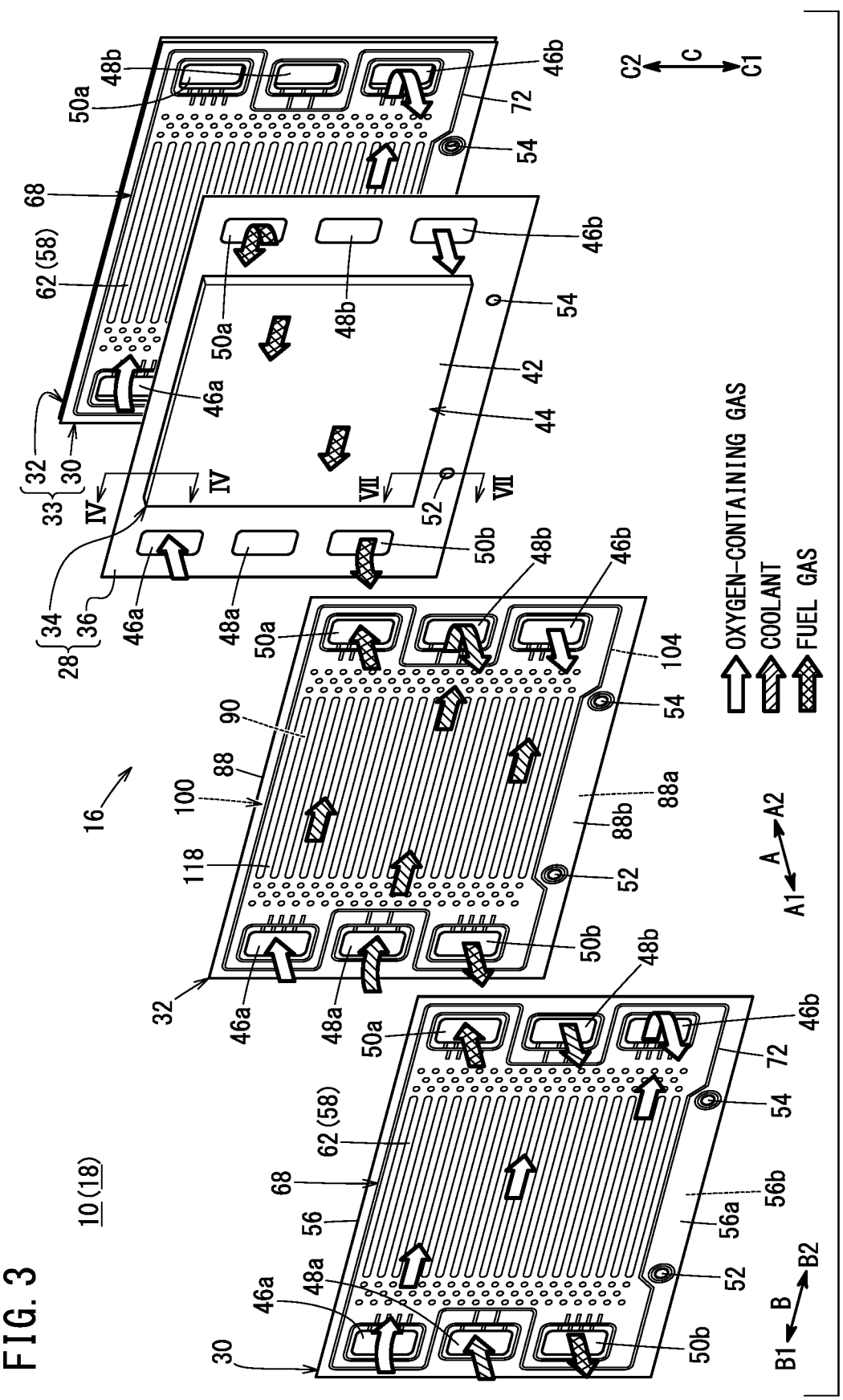
FIG. 3 is an exploded perspective view with partial omission showing a cell stack body in FIG. 2.

As shown in FIGS. 3 and 4, the power generation cell 16 has a laterally elongated rectangular shape. The power generation cell 16 includes a resin frame equipped membrane electrode assembly (hereinafter also referred to as a "resin frame equipped MEA 28", and a first separator member 30 and a second separator member 32 provided on both sides of the resin frame equipped MEA 28. Each of the first separator member 30 and the second separator member 32 is formed by press forming of a metal thin plate to have a corrugated shape in cross section. For example, each of the first separator member 30 and the second separator member 32 is a steel plate, a stainless steel plate, an aluminum plate, a plated steel plate, or a metal plate having an anti-corrosive surface by surface treatment. The first separator member 30 and the second separator member 32 are joined together by a plurality of joint lines (not shown) to form a joint separator 33.

The resin frame equipped MEA 28 includes a membrane electrode assembly (hereinafter referred to as an "MEA 34") and a resin frame member 36 (resin frame part, resin film) joined to, and provided around an outer peripheral portion of the MEA 34.

As shown in FIG. 4, the MEA 34 includes an electrolyte membrane 38, a cathode 40 provided on one surface 38a of the electrolyte membrane 38, and an anode 42 provided on another surface 38b of the electrolyte membrane 38.

For example, the electrolyte membrane 38 is a solid polymer electrolyte membrane (cation ion exchange membrane). For example, the sold polymer electrolyte membrane is a thin membrane of perfluorosulfonic acid containing water. The electrolyte membrane 38 is interposed between the cathode 40 and the anode 42. A fluorine based electrolyte may be used as the electrolyte membrane 38. Alternatively, an HC (hydrocarbon) based electrolyte may be used as the electrolyte membrane 38.

Though not shown, the cathode 40 includes a first electrode catalyst layer joined to the one surface 38a of the electrolyte membrane 38, and a first gas diffusion layer stacked on the first electrode catalyst layer. The anode 42 includes a second electrode catalyst layer joined to the other surface 38b of the electrolyte membrane 38, and a second gas diffusion layer stacked on the second electrode catalyst layer.

The inner peripheral end of the resin frame member 36 is held between the outer peripheral end of the cathode 40 and the outer peripheral end of the anode 42. Instead of using the resin frame member 36, the resin frame equipped MEA 28 may be configured to adopt structure where the electrolyte membrane 38 protrudes outward beyond the cathode 40 and the anode 42. In this case, frame shaped films may be provided on both sides of the electrolyte membrane 38 which protrudes beyond the cathode 40 and the anode 42.

The power generation cell 16 includes a power generation area 44 where the cathode 40 contacts the one surface 38a of the electrolyte membrane 38, and the anode 42 contacts the other surface 38b of the electrolyte membrane 38. That is, the power generation area 44 is positioned inside the inner peripheral end of the resin frame member 36. The power generation area 44 has a rectangular shape (quadrangular shape).

In FIG. 3, at one end of each of the power generation cells 16 in the long side direction (end in the direction indicated by an arrow B1), an oxygen-containing gas supply passage 46a, a coolant supply passage 48a, and a fuel gas discharge passage 50b are provided. The oxygen-containing gas supply passage 46a, the coolant supply passage 48a, the fuel gas discharge passage 50b are arranged in the short side direction of the power generation cell 16 (in the direction indicated by the arrow C).

The oxygen-containing gas supply passage 46a, the coolant supply passage 48a, and the fuel gas discharge passage 50b extend through the cell stack body 18, the first inner insulating plate 22a, and the first outer insulating plate 24a, respectively. An oxygen-containing gas as one of reactant gases flows through the oxygen-containing gas supply passage 46a in the direction indicated by the arrow A2. A coolant (e.g., pure water, ethylene glycol, oil) flows through the coolant supply passage 48a in the direction indicated by the arrow A2. A fuel gas such as the hydrogen-containing gas as the other of the reactant gases flows through the fuel gas discharge passage 50b in the direction indicated by the arrow A1.

At the other end of each of the power generation cells 16 in the long side direction (end in the direction indicated by an arrow B2), a fuel gas supply passage 50a, a coolant discharge passage 48b, and an oxygen-containing gas discharge passage 46b are provided. The fuel gas supply passage 50a, the coolant discharge passage 48b, and the oxygen-containing gas discharge passage 46b are arranged in the direction indicated by the arrow C.

The fuel gas supply passage 50a, the coolant discharge passage 48b, and the oxygen-containing gas discharge passage 46b extend through the cell stack body 18, the first inner insulating plate 22a, and the first outer insulating plate 24a in the stacking direction, respectively. The fuel gas flows through the fuel gas supply passage 50a in the direction indicated by the arrow A2. The coolant flows through the coolant discharge passage 48b in the direction indicated by the arrow A1. The oxygen-containing gas flows through the oxygen-containing gas discharge passage 46b in the direction indicated by the arrow A1.

At one end of each of the power generation cells 16 in the short side direction (end in the direction indicated by an arrow C1), a first drain passage 52 and a second drain passage 54 are provided. Each of the first drain passage 52 and the second drain passage 54 penetrates through the cell stack body 18, the first inner insulating plate 22a, and the first outer insulating plate 24a in the stacking direction.

The position of the first drain passage 52 is shifted from the center of the power generation cell 16 in the longitudinal direction, in the direction indicated by the arrow B1. The first drain passage 52 is connected to the fuel gas discharge passage 50b through a connection channel (not shown) provided in the second inner insulating plate 22b or the second outer insulating plate 24b. That is, the first drain passage 52 discharges some of the water produced during operation (power generation) of the power generation cells 16 and guided into the fuel gas discharge passage 50b, to the outside.

The position of the second drain passage 54 is shifted from the center of the power generation cell 16, in the direction indicated by the arrow B2. The second drain passage 54 is connected to the oxygen-containing gas discharge passage 46b through a connection channel (not shown) provided in the second inner insulating plate 22b or the second outer insulating plate 24b. That is, the second drain passage 54 discharges some of the water produced during operation (power generation) of the power generation cell 16 and guided into the oxygen-containing gas discharge passage 46b, to the outside.

The positions, shapes, and sizes of the above described passages (oxygen-containing gas supply passage 46a, etc.) are not limited to the embodiment of the present invention, and may be determined as necessary depending on the required specification.

Figure 5:
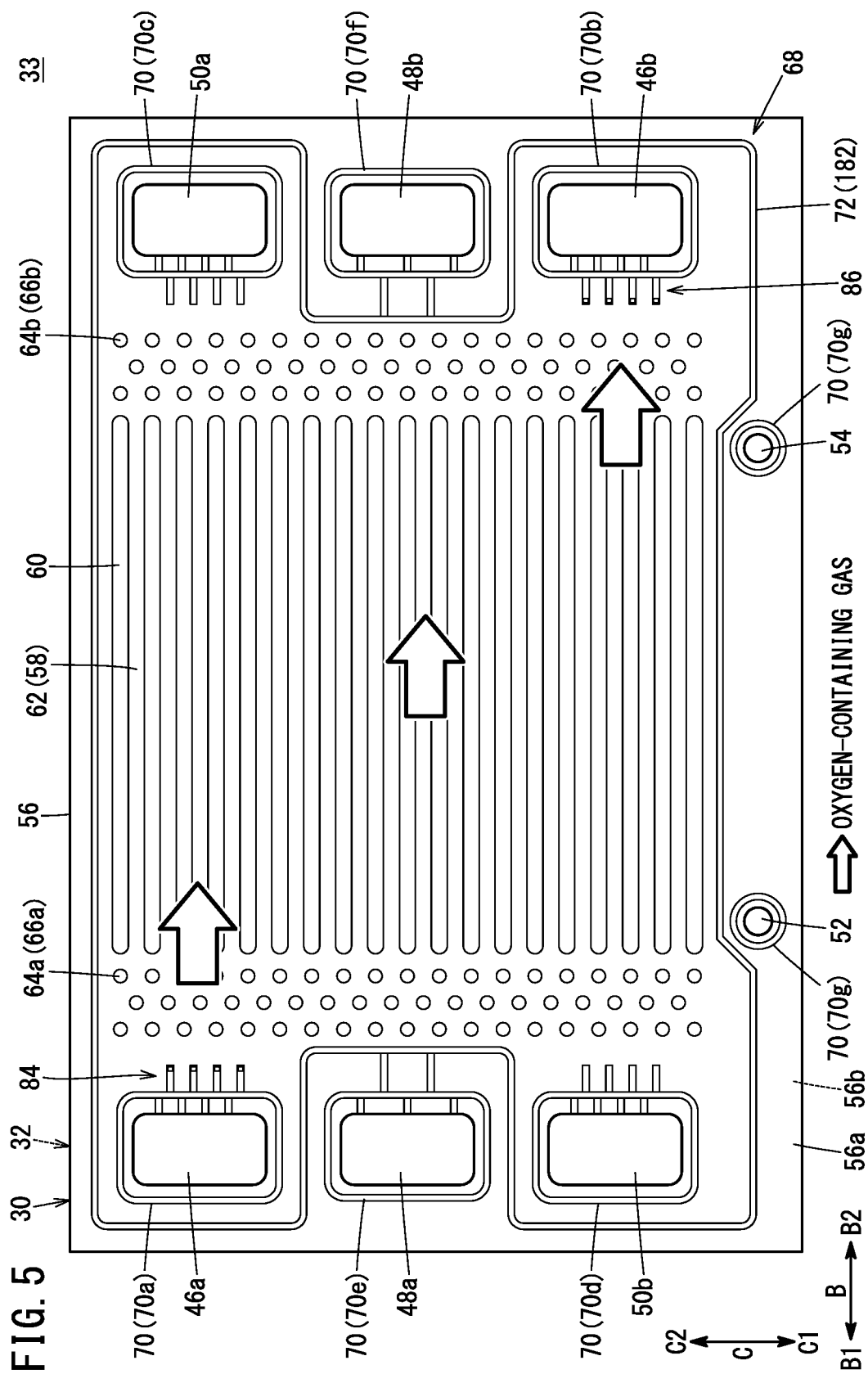
FIG. 5 is a plan view showing a joint separator, as viewed from a side where a first separator member is present.

As shown in FIGS. 4 and 5, the first separator member 30 includes a first separator body 56 in the form of a metal plate. The first separator body 56 has an oxygen-containing gas flow field 58 (reactant gas flow field) on its surface facing the resin frame equipped MEA 28 (hereinafter referred to as a "surface 56a"). The oxygen-containing gas flow field 58 extends in the direction indicated by the arrow B. The oxygen-containing gas flow field 58 is in fluid communication with the oxygen-containing gas supply passage 46a and the oxygen-containing gas discharge passage 46b. The oxygen-containing gas as a reactant gas flowing through the oxygen-containing gas flow field 58 is supplied to the cathode 40 (power generation area 44).

The oxygen-containing gas flow field 58 includes a plurality of first flow field grooves 62 formed between a plurality of straight first flow field ridges 60 extending in the direction indicated by the arrow B. It should be noted that the oxygen-containing gas flow field 58 (the first flow field ridges 60 and the first flow field grooves 62) may extend in a wavy pattern in the direction indicated by the arrow B. The first flow field ridges 60 are formed integrally with the first separator body 56 by press forming, to protrude toward the MEA 34.

In FIG. 4, the first flow field ridge 60 has a trapezoidal shape in lateral cross section which is narrowed in the direction in which the first flow field ridges 60 protrude. That is, the first flow field ridges 60 are deformed elastically by the compression load in the direction indicated by the arrow A.

The first flow field ridge 60 includes a pair of first side parts 63 disposed to face each other, and a first top part 65 coupling the protruding ends of the pair of first side parts 63. The space between the pair of first side parts 63 is narrowed gradually toward the first top part 65. It should be noted that the first side parts 63 may be in parallel to the separator thickness direction (direction indicated by the arrow A). That is, the first flow field ridge 60 may have a rectangular shape or a square shape in lateral cross section.

As shown in FIG. 5, a first inlet buffer 66a is provided on the surface 56a of the first separator body 56, between the oxygen-containing gas supply passage 46a and the oxygen-containing gas flow field 58. The first inlet buffer 66a includes a plurality of boss arrays each comprising a plurality of bosses 64a arranged in the direction indicated by the arrow C. Further, a first outlet buffer 66b is provided on the surface 56a of the first separator body 56, between the oxygen-containing gas discharge passage 46b and the oxygen-containing gas flow field 58. The first outlet buffer 66b includes a plurality of boss arrays each comprising a plurality of bosses 64b arranged in the direction indicated by the arrow C.

A first seal 68 is provided on the surface 56a of the first separator body 56, for preventing leakage of fluid such as reactant gases (e.g., the oxygen-containing gas and the fuel gas) or the coolant. The first seal 68 is pressed against the resin frame member 36 (see FIG. 4). The first seal 68 extends straight as viewed in the separator thickness direction (direction indicated by the arrow A). It should be noted that the first seal 68 may extend in a wavy pattern as viewed in the separator thickness direction.

The first seal 68 includes a plurality of first fluid passage seals 70 provided around the plurality of fluid passages (e.g., the oxygen-containing gas supply passage 46a), respectively, and a first flow field seal 72 provided on the outer peripheral portion of the first separator body 56.

Hereinafter, among the plurality of first fluid passage seals 70, the first fluid passage seal 70 around the oxygen-containing gas supply passage 46a will be referred to as a "first fluid passage seal 70a", and the first fluid passage seal 70 around the oxygen-containing gas discharge passage 46b will be referred to as a "first fluid passage seal 70b". Further, among the plurality of first fluid passage seals 70, the first fluid passage seal 70 around the fuel gas supply passage 50a will be referred to as a "first fluid passage seal 70c", and the first fluid passage seal 70 around the fuel gas discharge passage 50b will be referred to as a "first fluid passage seal 70d". Further, among the plurality of first fluid passage seals 70, the first fluid passage seal 70 around the coolant supply passage 48a will be referred to as a "first fluid passage seal 70e", and the first fluid passage seal 70 around the coolant discharge passage 48b will be referred to as a "first fluid passage seal 70f". Moreover, among the plurality of first fluid passage seals 70, the first fluid passage seals 70 around the first drain passage 52 and the second drain passage 54 will be referred to as a "first fluid passage seals 70g".

The first flow field seal 72 prevents leakage of the reactant gas (oxygen-containing gas). The first flow field seal 72 is formed around the oxygen-containing gas flow field 58, the first inlet buffer 66a, the first outlet buffer 66b, and the plurality of first fluid passage seals 70a to 70d. The first fluid passage seals 70e to 70g are positioned outside the first flow field seal 72. The first flow field seal 72 extends around the power generation area 44 (see FIG. 4).

At one end of the first separator body 56 in the long side direction (direction indicated by the arrow B1), the first flow field seal 72 extends in a serpentine pattern, between the first fluid passage seal 70a and the first fluid passage seal 70e, and between the first fluid passage seal 70d and the first fluid passage seal 70e.

At the other end of the first separator body 56 in the long side direction (direction indicated by the arrow B2), the first flow field seal 72 extends in a serpentine pattern, between the first fluid passage seal 70c and the first fluid passage seal 70f, and between the first fluid passage seal 70b and the first fluid passage seal 70f.

As shown in FIG. 4, the first seal 68 includes a first seal bead 76 formed integrally with the first separator body 56 by press forming, to protrude toward the resin frame equipped MEA 28, and a first resin member 78 provided on the first seal bead 76. The first seal bead 76 has a trapezoidal shape which is narrowed in the direction in which the first seal bead 76 protrudes. That is, the first seal bead 76 is elastically deformed by the compression load in the direction indicated by the arrow A.

The first seal bead 76 includes a pair of first bead side parts 80 disposed to face each other, and a first bead top part 82 coupling the protruding ends of the pair of first bead side parts 80. The space between the pair of first bead side parts 80 is narrowed gradually toward the first bead top part 82. It should be noted that the first bead side parts 80 may be in parallel to the separator thickness direction (direction indicated by the arrow A). That is, the first seal bead 76 may have a rectangular shape or a square shape in lateral cross section.

The first resin member 78 is an elastic member fixed to a protruding end surface (outer surface of the first bead top part 82) of the first seal bead 76 by printing or coating. The first resin member 78 may be made of polyester fiber, for example. It should be noted that the first resin member 78 may be dispensed with.

In FIG. 5, a bridge section 84 is provided on the first separator body 56. The bridge section 84 connects the inside of the first fluid passage seal 70 (side closer to the oxygen-containing gas supply passage 46a) and the outside of the first fluid passage seal 70 (side closer to the oxygen-containing gas flow field 58). A bridge section 86 is provided on the first separator body 56. The bridge section 86 connects the inside of the first fluid passage seal 70 (side closer to the oxygen-containing gas discharge passage 46b) and the outside of the first fluid passage seal 70 (side closer to the oxygen-containing gas flow field 58).

Figure 6:
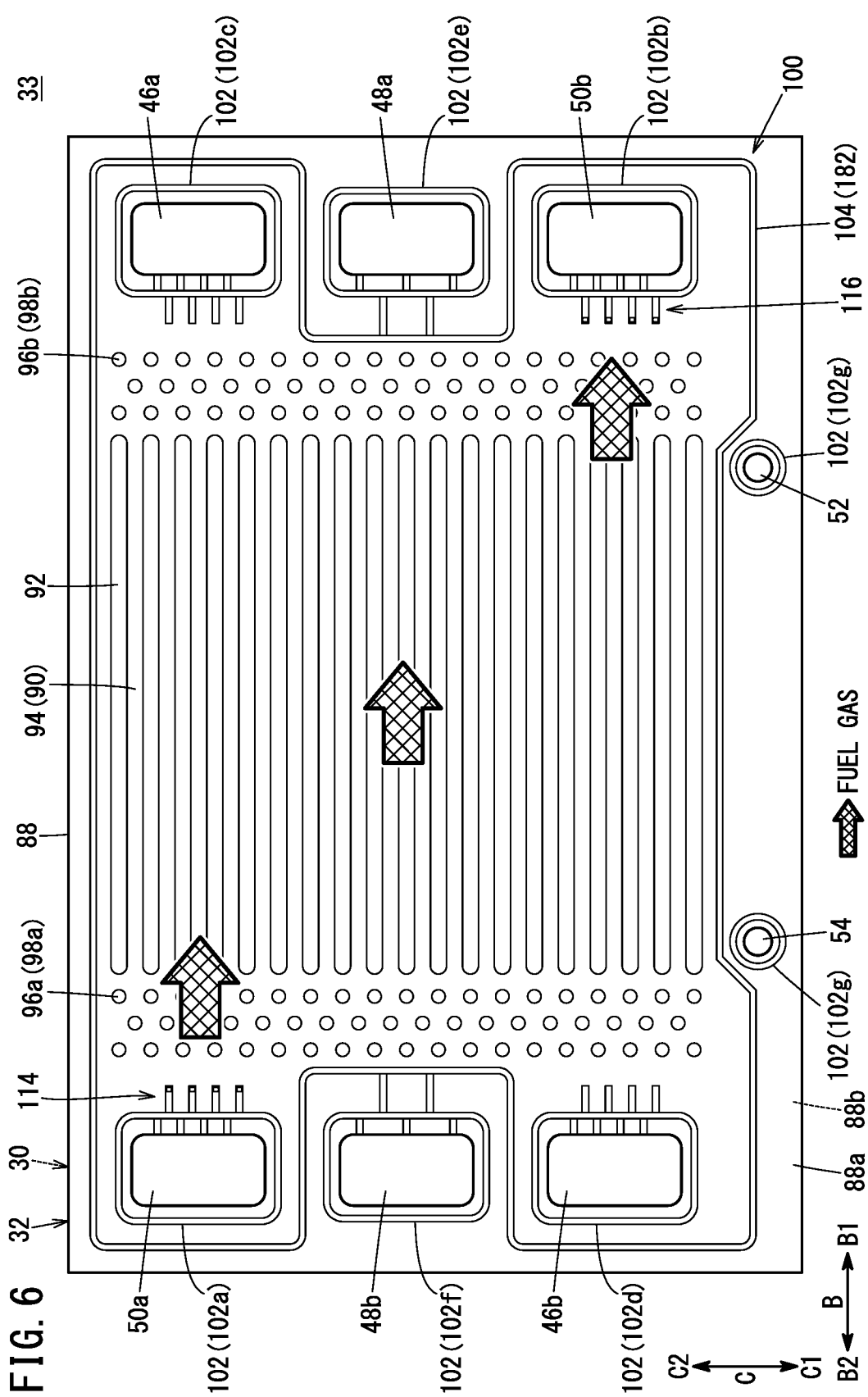
FIG. 6 is a plan view showing the joint separator, as viewed from a side where a second separator member is present.

As shown in FIGS. 4 and 6, the second separator member 32 includes a second separator body 88 in the form of a metal plate. The second separator body 88 has a fuel gas flow field 90 on its surface facing the resin frame equipped MEA 28 (hereinafter referred to as a "surface 88a"). For example, the fuel gas flow field 90 extends in the direction indicated by the arrow B. The fuel gas flow field 90 is in fluid communication with the fuel gas supply passage 50a and the fuel gas discharge passage 50b. The fuel gas as a reactant gas flowing through the fuel gas flow field 90 is supplied to the anode 42 (power generation area 44).

The fuel gas flow field 90 includes a plurality of straight second flow field grooves 94 formed between a plurality of straight second flow field ridges 92 extending in the direction indicated by the arrow B. It should be noted that the fuel gas flow field 90 (the second flow field ridges 92 and the second flow field grooves 94) may extend in a wavy pattern in the direction indicated by the arrow B. The second flow field ridges 92 are formed integrally with the second separator body 88 by press forming and protruding toward the MEA 34.

In FIG. 4, the second flow field ridge 92 has a trapezoidal shape in lateral cross section which is narrowed in the direction in which the second flow field ridge 92 protrudes. That is, the second flow field ridges 92 are deformed elastically by the compression load in the direction indicated by the arrow A.

The second flow field ridges 92 include a pair of second side parts 95 disposed to face each other, and a second top part 97 coupling the protruding ends of the pair of second side parts 95. The space between the pair of second side parts 95 is narrowed gradually toward the second top part 97. It should be noted that the second side parts 95 may be in parallel to the separator thickness direction (direction indicated by the arrow A). That is, the second flow field ridge 92 may have a rectangular shape or a square shape in lateral cross section.

As shown in FIG. 6, a second inlet buffer 98a is provided on the surface 88a of the second separator body 88, between the fuel gas supply passage 50a and the fuel gas flow field 90. The second inlet buffer 98a comprises a plurality of boss arrays each comprising a plurality of bosses 96a arranged in the direction indicated by the arrow C. Further, a second outlet buffer 98b is provided on the surface 88a of the second separator body 88, between the fuel gas discharge passage 50b and the fuel gas flow field 90. The second outlet buffer 98b includes a plurality of boss arrays each comprising a plurality of bosses 96b arranged in the direction indicated by the arrow C.

A second seal 100 is provided on the surface 88a of the second separator body 88, for preventing leakage of fluid such as reactant gases (e.g., the oxygen-containing gas and the fuel gas) or the coolant. The second seal 100 is pressed against the resin frame member 36 (see FIG. 4). The second seal 100 extends straight as viewed in the separator thickness direction (direction indicated by the arrow A). It should be noted that the second seal 100 may extend in a wavy pattern as viewed in the separator thickness direction.

The second seal 100 includes a plurality of second fluid passage seals 102 provided around the plurality of fluid passages (e.g., the fuel gas supply passage 50a), respectively, and a second flow field seal 104 provided on the outer peripheral portion of the second separator body 88.

Hereinafter, among the plurality of second fluid passage seals 102, the second fluid passage seal 102 around the fuel gas supply passage 50a will be referred to as a "second fluid passage seal 102a", and the second fluid passage seal 102 around the fuel gas discharge passage 50b will be referred to as a "second fluid passage seal 102b". Further, among the plurality of second fluid passage seals 102, the second fluid passage seal 102 around the oxygen-containing gas supply passage 46a will be referred to as a "second fluid passage seal 102c", and the second fluid passage seal 102 around the oxygen-containing gas discharge passage 46b will be referred to as a "second fluid passage seal 102d". Further, among the plurality of second fluid passage seals 102, the second fluid passage seal 102 around the coolant supply passage 48a will be referred to as a "second fluid passage seal 102e", and the second fluid passage seal 102 around the coolant discharge passage 48b will be referred to as a "second fluid passage seal 102f". Moreover, among the plurality of second fluid passage seals 102, the second fluid passage seals 102 around the first drain passage 52 and the second drain passage 54 will be referred to as "second fluid passage seals 102g".

The second flow field seal 104 prevents leakage of the reactant gas (fuel gas). The second flow field seal 104 is formed around the fuel gas flow field 90, the second inlet buffer 98a, the second outlet buffer 98b, and the plurality of second fluid passage seals 102a to 102d. The second fluid passage seals 102e to 102g are positioned outside the second flow field seal 104. The second flow field seal 104 extends around the power generation area 44 (see FIG. 4).

At one end of the second separator body 88 in the long side direction (direction indicated by the arrow B1), the second flow field seal 104 extends in a serpentine pattern, between the second fluid passage seal 102c and the second fluid passage seal 102e, and between the second fluid passage seal 102b and the second fluid passage seal 102e.

At the other end of the second separator body 88 in the long side direction (direction indicated by the arrow B2), the second flow field seal 104 extends in a serpentine pattern, between the second fluid passage seal 102a and the second fluid passage seal 102f, and between the second fluid passage seal 102d and the second fluid passage seal 102f.

As shown in FIG. 4, the second seal 100 includes a second seal bead 106 formed integrally with the second separator body 88 by press forming, to protrude toward the resin frame equipped MEA 28, and a second resin member 108 provided on the second seal bead 106. The second seal bead 106 has a trapezoidal shape which is narrowed in the direction in which the second seal bead 106 protrudes. That is, the second seal bead 106 is elastically deformed by the compression load in the direction indicated by the arrow A.

The second seal bead 106 includes a pair of second bead side parts 110 disposed to face each other, and a second bead top part 112 coupling the protruding ends of the pair of second bead side parts 110. The space between the pair of second bead side parts 110 is narrowed gradually toward the second bead top part 112. It should be noted that the second bead side parts 110 may be in parallel to the separator thickness direction (direction indicated by the arrow A). That is, the second seal bead 106 may have a rectangular shape or a square shape in lateral cross section.

The second resin member 108 is an elastic member fixed to a protruding end surface (outer surface of the second bead top part 112) of the second seal bead 106 by printing or coating. The second resin member 108 is made of polyester fiber, for example. It should be noted that the second resin member 108 may be dispensed with.

In FIG. 6, a bridge section 114 is provided on the second separator body 88. The bridge section 114 connects the inside of the second fluid passage seal 102 (side closer to the fuel gas supply passage 50a) and the outside of the second fluid passage seal 102 (side closer to the fuel gas flow field 90). A bridge section 116 is provided on the second separator body 88. The bridge section 116 connects the inside of the second fluid passage seal 102 (side closer to the fuel gas discharge passage 50b) and the outside of the second fluid passage seal 102 (side closer to the fuel gas flow field 90).

As shown in FIGS. 3 and 4, a coolant flow field 118 is formed between a back surface 56b of the first separator body 56 and a back surface 88b of the second separator body 88 that are joined together. The coolant flow field 118 is connected to (in fluid communication with) the coolant supply passage 48a and the coolant discharge passage 48b. When the first separator body 56 and the second separator body 88 are stacked together, the coolant flow field 118 is formed between the back surface of the oxygen-containing gas flow field 58 of the first separator body 56 and the back surface of the fuel gas flow field 90 of the second separator body 88.

As shown in FIG. 4, in the power generation cell 16, the plurality of first flow field ridges 60 face the plurality of second flow field ridges 92 through the MEA 34, respectively. The first flow field seal 72 face the second flow field seal 104 through the resin frame member 36. The plurality of first fluid passage seals 70 faces the second fluid passage seals 102 through the resin frame member 36 (see FIG. 3), respectively.

Figure 7:
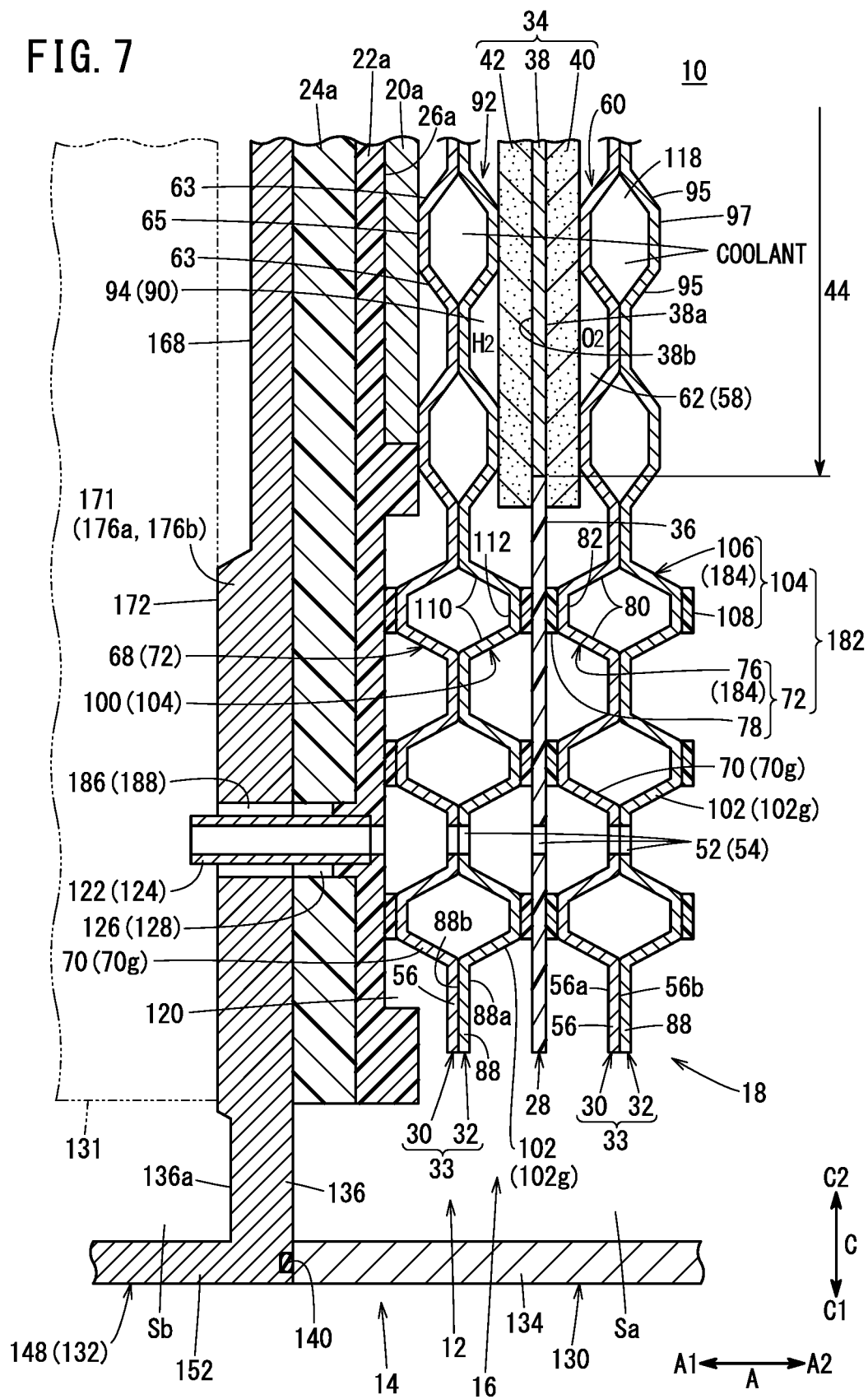
FIG. 7 is an enlarged cross sectional view with partial omission showing the fuel cell stack taken along a line VII-VII in FIG. 3.

As shown in FIGS. 4 and 7, a groove 120 is formed on an inner surface of the first inner insulating plate 22a. The first seal 68 of the first separator member 30 at the outermost position in the direction indicated by the arrow A1 is disposed in the groove 120. That is, the first flow field seal 72 of the first separator member 30 at the outermost position is pressed against the bottom surface of the groove 120.

The outer surface of the first inner insulating plate 22a overlapped with the power generation area 44 in the direction indicated by the arrow A (surface in the direction indicated by the arrow A1) contacts the inner surface of the first outer insulating plate 24a (surface in the direction indicated by the arrow A2) by surface to surface contact. The outer surface of the first inner insulating plate 22a overlapped with the first seal 68 and the second seal 100 in the direction indicated by the arrow A contacts the inner surface of the first outer insulating plate 24a by surface to surface contact.

In FIG. 7, the first inner insulating plate 22a is provided with a first drain pipe 122 and a second drain pipe 124, for discharging the water produced in power generation guided from the first drain passage 52, to the outside of the stack body 12. A first insertion hole 126 and a second insertion hole 128 penetrate through the first outer insulating plate 24a in the direction indicated by the arrow A. The first drain pipe 122 is inserted into the first insertion hole 126, and the second drain pipe 124 is inserted into the second insertion hole 128.

As shown in FIGS. 1 and 2, the case unit 14 includes a stack case 130 forming stack container space Sa containing the stack body 12, and an auxiliary device case 132 forming auxiliary device container space Sb containing fuel cell auxiliary devices 131 (see FIG. 2). The case unit 14 has a rectangular shape as viewed in a direction perpendicular to the direction indicated by the arrow A, and the long sides of the case unit 14 extend in the direction indicated by the arrow A.

As shown in FIG. 2, the stack case 130 includes a quadrangular-tubular peripheral wall case 134 covering the outer peripheral surface of the stack body 12, a first end plate 136 provided at one end of the peripheral wall case 134 (end in the direction indicated by the arrow A1), and a second end plate 138 provided at the other end of the peripheral wall case 134 (end in the direction indicated by the arrow A2). That is, the stack container space Sa is formed by the peripheral wall case 134, the first end plate 136, and the second end plate 138.

The first end plate 136 is joined to the peripheral wall case 134 to close a first opening 134a at one end of the peripheral wall case 134 using bolts (not shown). An elastic annular seal member 140 is interposed between the first end plate 136 and the peripheral wall case 134 along the outer periphery of the first opening 134a. The surface of the first end plate 136 facing the stack body 12 (surface in the direction indicated by the arrow A2) contacts the first outer insulating plate 24a by surface to surface contact. The structure of the first end plate 136 will be described in detail later.

The second end plate 138 is joined to the peripheral wall case 134 to close a second opening 134b at the other end of the peripheral wall case 134 using bolts 142. An elastic annular seal member 144 is interposed between the second end plate 138 and the peripheral wall case 134 along the outer periphery of the second opening 134b. A plurality of shim plates 146 are provided between the stack body 12 (second outer insulating plate 24b) and the second end plate 138, for adjusting the magnitude of the compression load applied to the cell stack body 18. The shim plates 146 contact the second end plate 138 by surface to surface contact. Stated otherwise, by tightening the second end plate 138 to the peripheral wall case 134 using the bolts 142, a compression load is applied to the cell stack body 18.

The auxiliary device case 132 is a protection case for protecting the fuel cell auxiliary devices 131 accommodated in the auxiliary device container space Sb. Examples of the fuel cell auxiliary devices 131 accommodated in the auxiliary device container space Sb include a gas liquid separator, an injector, an ejector, a fuel gas pump, and valves (all of which are not shown).

The auxiliary device case 132 is formed by joining a box-shaped first case member 148 opened in the direction indicated by the arrow A1 and a box-shaped second case member 150 opened in the direction indicated by the arrow A2. The first case member 148 includes the above described first end plate 136, a first peripheral wall 152 protruding from the outer peripheral portion of the first end plate 136 in the direction indicated by the arrow A1, and an annular first flange 154 provided at the protruding end of the first peripheral wall 152. The first end plate 136 serves as both of a wall of the stack case 130 and a wall of the auxiliary device case 132. Stated otherwise, the first end plate 136 is a partition wall between the stack container space Sa and the auxiliary device container space Sb.

The second case member 150 includes an outer end plate 156 positioned at an end of the case unit 14 in the direction indicated by the arrow A1, a second peripheral wall 158 protruding from an outer peripheral portion of the outer end plate 156 in the direction indicated by the arrow A2, and an annular second flange 160 provided at a protruding end of the second peripheral wall 158. The first case member 148 and the second case member 150 are joined together integrally, by tightening the first flange 154 and the second flange 160 together using bolts 162 in the state where the first flange 154 and the second flange 160 contact each other.

Figure 8:
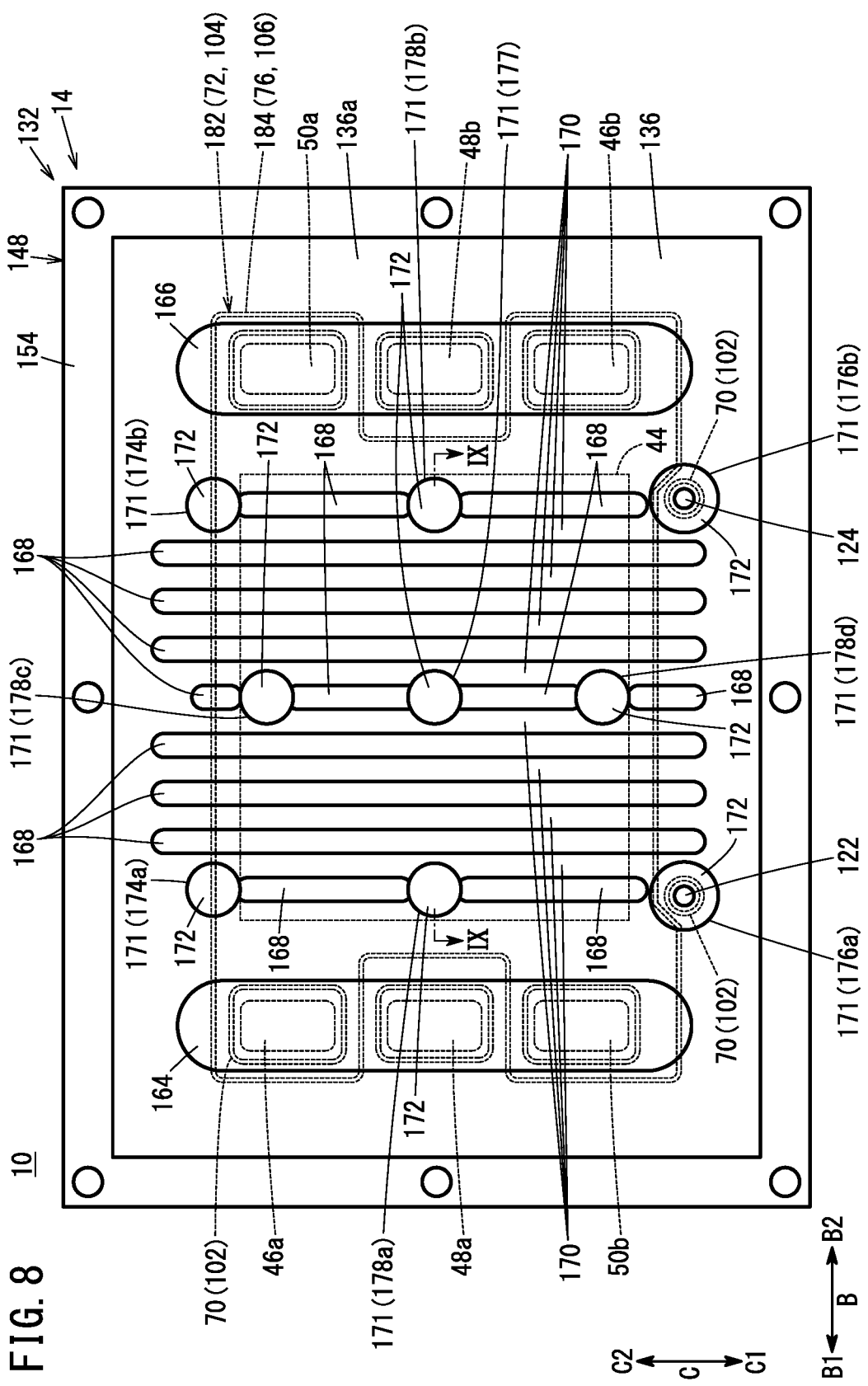
FIG. 8 is a plan view showing a first case member, as viewed from a side opposite to the stack body.

As shown in FIG. 8, the first end plate 136 has a rectangular shape. Two pipe openings 164, 166 are formed in the first end plate 136. The two pipe openings 164, 166 are spaced from each other in the long side direction (direction indicated by the arrow B) of the first end plate 136. Each of the pipe openings 164, 166 extends in the short side direction (direction indicated by the arrow C) of the first end plate 136.

Connection pipes (not shown) connected respectively to the oxygen-containing gas supply passage 46a, the coolant supply passage 48a, and the fuel gas discharge passage 50b are inserted into one of pipe openings 164. Connection pipes (not shown) connected respectively to the fuel gas supply passage 50a, the coolant discharge passage 48b, and the oxygen-containing gas discharge passage 46b are inserted into the other of pipe openings 166.

As shown in FIGS. 2, 4, and 7 to 9, a plurality of grooves 168 are formed on a surface 136a of the first end plate 136 closer to the second case member 150. The grooves 168 extend straight in the direction indicated by the arrow C. The plurality of grooves 168 are spaced from each other in the direction indicated by the arrow B. That is, in FIGS. 8 and 9, a rib 170 is formed in the first end plate 136 between the grooves 168 that are adjacent to each other. The plurality of grooves 168 and the plurality of ribs 170 are positioned between the two pipe openings 164, 166 (see FIG. 8).

Further, as shown in FIGS. 2, 4, and 7 to 9, a plurality of projections 171 are provided on the surface 136a of the first end plate 136. The plurality of projections 171 protrude integrally from the surface 136a of the first end plate 136. The protruding end of each of the projections 171 is provided with a flat support surface 172 oriented in the direction indicated by the arrow A1.

In FIG. 4, the plurality of projections 171 have a same height H1 (distance from the surface 136a of the first end plate 136 to the support surface 172). Stated otherwise, the support surfaces 172 of the plurality of projections 171 are positioned on a single (same) plane surface perpendicular to the direction indicated by the arrow A.

In FIG. 2, the height H1 of each of the projections 171 is smaller than a height H2 of the first peripheral wall 152 (distance from the surface 136a of the first end plate 136 to the protruding end of the first peripheral wall 152). That is, the support surfaces 172 of the plurality of projections 171 are positioned on a side close to the first end plate 136 in comparison with the protruding end of the first peripheral wall 152 (in the direction indicated by the arrow A2).

As shown in FIG. 8, in the embodiment of the present invention, on the surface 136a of the first end plate 136, as the plurality of projections 171, two first projections 174a, 174b, two second projections 176a, 176b, one central projection 177, and four outer peripheral projections 178a, 178b, 178c, 178d are provided. Each of the first projections 174a, 174b is a boss protruding from the first end plate 136 in a columnar shape (see FIG. 4).

In FIGS. 4 and 8, the support surfaces 172 of the two first projections 174a, 174b are overlapped with the first flow field seal 72 and the second flow field seal 104 (hereinafter simply referred to as a "flow field seal 182") as viewed in the direction indicated by the arrow A. That is, the support surfaces 172 of the two first projections 174a, 174b are overlapped with first seal bead 76 and the second seal bead 106 (hereinafter simply referred to as a "seal bead 184") as viewed in the direction indicated by the arrow A.

Specifically, the two first projections 174a, 174b are positioned on a side (in the direction indicated by the arrow C2) opposite to the first drain pipe 122 (second drain pipe 124) in the power generation area 44 as viewed in the direction indicated by the arrow A. Stated otherwise, the two first projections 174a, 174b are positioned above the power generation area 44. The two first projections 174a, 174b are positioned adjacent to two corners of the power generation area 44 in the direction indicated by the arrow C2, as viewed in the direction indicated by the arrow A.

As shown in FIG. 7, each of the second projections 176a, 176b is a boss protruding from the first end plate 136 in a circular pipe shape. The inner hole of the second projection 176a is a through hole 186 which penetrates through the first end plate 136, and the first drain pipe 122 is inserted into the through hole 186. The inner hole of the second projection 176b is a through hole 188 which penetrates through the first end plate 136, and the second drain pipe 124 is inserted into the through hole 188. The support surfaces 172 of the two second projections 176a, 176b are overlapped with the flow field seal 182, as viewed in the direction indicated by the arrow A. That is, the support surfaces 172 of the two second projections 176a, 176b are overlapped with the seal bead 184, as viewed in the direction indicated by the arrow A.

In FIG. 8, the two second projections 176a, 176b are shifted from the power generation area 44 in the direction indicated by the arrow C1, as viewed in the direction indicated by the arrow A. Stated otherwise, the two second projections 176a, 176b are positioned below the power generation area 44. The support surfaces 172 of the two second projections 176a, 176b are positioned adjacent to two corners of the power generation area 44 in the direction indicated by the arrow C1, as viewed in the direction indicated by the arrow A.

In FIGS. 2, 4, 8, and 9, each of the central projection 177 and the four outer peripheral projections 178a, 178b, 178c, 178d is a boss protruding from the first end plate 136 in a columnar shape. The central projection 177 is overlapped with the center of the power generation area 44 as viewed in the direction indicated by the arrow A (see FIG. 8).

In FIG. 8, the four outer peripheral projections 178a, 178b, 178c, 178d are overlapped with the outer peripheral portion of the power generation area 44 as viewed in the direction indicated by the arrow A. Specifically, the outer peripheral projections 178a, 178b, 178c, 178d are overlapped with the central portions of the sides of the power generation area 44 as viewed in the direction indicated by the arrow A.

That is, the outer peripheral projection 178a is overlapped with the portion shifted from the center of the power generation area 44 in the direction indicated by the arrow B1, as viewed in the direction indicated by the arrow A. The outer peripheral projection 178a is positioned between the first projection 174a and the second projection 176a. The outer peripheral projection 178b is overlapped with the portion shifted from the center of the power generation area 44 in the direction indicated by the arrow B2, as viewed in the direction indicated by the arrow A. The outer peripheral projection 178b is positioned between the first projection 174b and the second projection 176b.

The outer peripheral projection 178c is overlapped with the portion shifted from the center of the power generation area 44 in the direction indicated by the arrow C2, as viewed in the direction indicated by the arrow A. The outer peripheral projection 178d is overlapped with the portion shifted from the center of the power generation area 44 in the direction indicated by the arrow C1, as viewed in the direction indicated by the arrow A.

Figure 9:
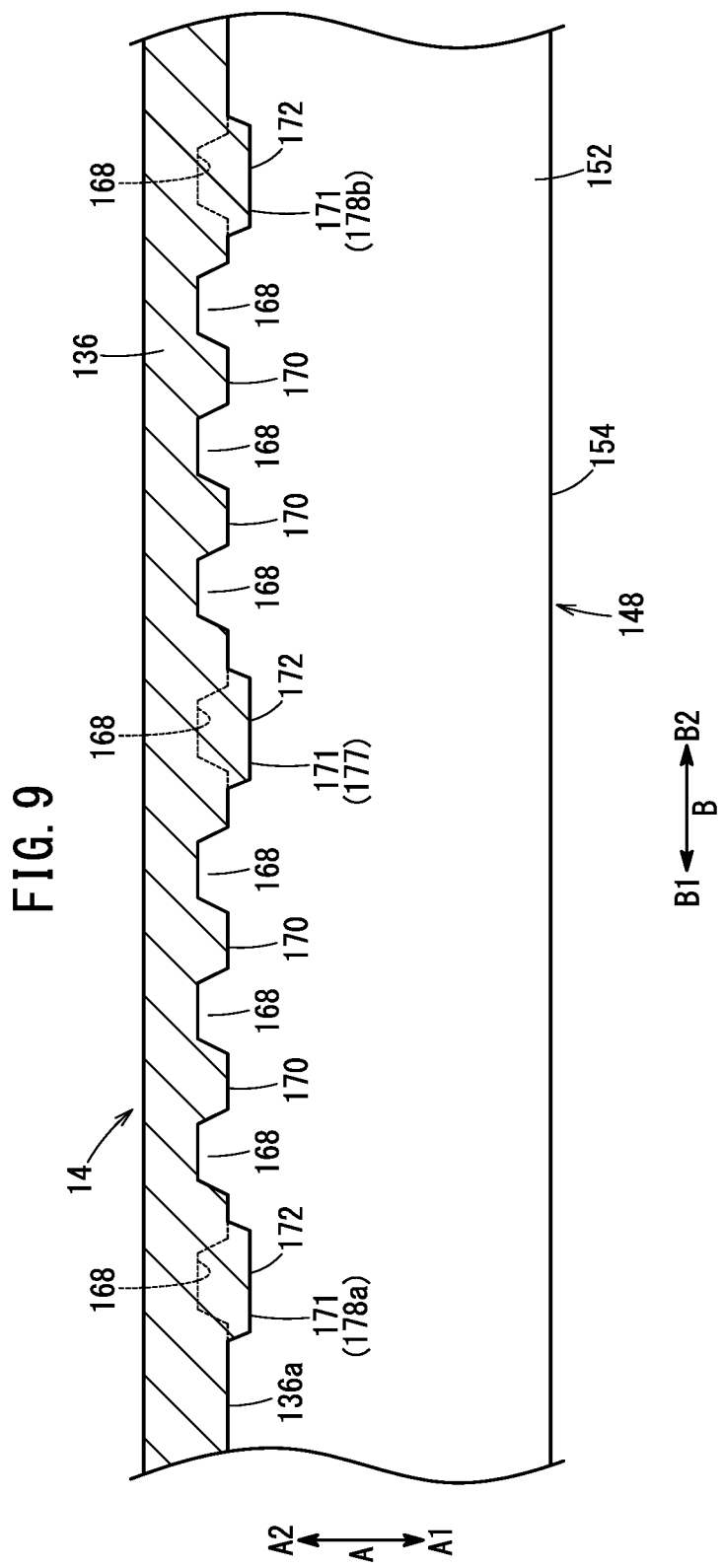
FIG. 9 is a cross sectional view with partial omission, taken along a line IX-IX in FIG. 8.

As shown in FIGS. 8 and 9, each of the central projection 177 and the outer peripheral projections 178c, 178d is provided in a groove 168 between the ribs 170 in a manner to extend across a gap between the ribs 170 that are adjacent to each other. That is, the ribs 170 provided on both sides of the groove 168 are connected together through the central projection 177 and the outer peripheral projections 178c, 178d. Stated otherwise, each of the central projection 177 and the outer peripheral projections 178c, 178d is coupled to the ribs 170 that are adjacent to each other.

In FIG. 9, ends of the plurality of ribs 170 in the direction indicated by the arrow A1 are positioned on a side shifted from the support surfaces 172 of the plurality of projections 171 toward the cell stack body 18 (direction indicated by the arrow A2). Stated otherwise, the support surfaces 172 of the plurality of projections 171 are positioned on a side shifted from the end surfaces of the plurality of ribs 170 in the direction indicated by the arrow A1. In the direction indicated by the arrow A, the end surface of each of the ribs 170 and the surface 136a of the first end plate 136 are present at the same position.

Figure 10:
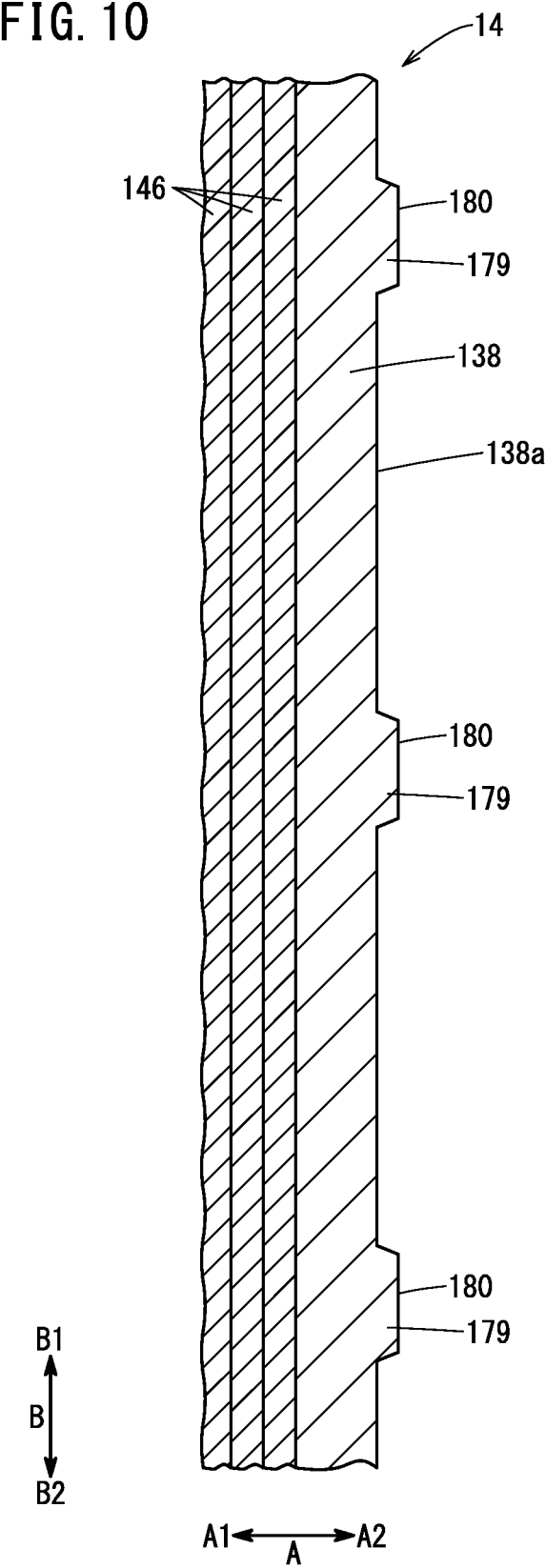
FIG. 10 is a cross sectional view with partial omission, taken along a line X-X in FIG. 2.

As shown in FIGS. 2 and 10, a plurality of projections 179 are provided on a surface 138a (outer surface) of the second end plate 138 opposite to the stack body 12. The plurality of projections 179 protrude integrally from the surface 138a of the second end plate 138 in a columnar shape. The protruding end of each of the projections 179 is provided with a support surface 180 oriented in the direction indicated by the arrow A2.

The plurality of projections 179 have the same height (distance from the surface 138a of the second end plate 138 to the support surface 180). Stated otherwise, the support surfaces 180 of the plurality of projections 179 are positioned on a single surface (same surface) perpendicular to the direction indicated by the arrow A.

The layout of the plurality of projections 179 relative to the surface 138a of the second end plate 138 is substantially the same as the layout of the plurality of projections 171 relative to the surface 136a of the first end plate 136. Stated otherwise, the plurality of projections 179 are overlapped with the plurality of projections 171 as viewed in the direction indicated by the arrow A.

That is, some of the support surfaces 180 of the plurality of projections 179 are overlapped with the seal bead 184 as viewed in the direction indicated by the arrow A, and some of the support surfaces 180 of the plurality of projections 179 are overlapped with the power generation area 44 as viewed in the direction indicated by the arrow A.

Operation of the fuel cell stack 10 having the above structure will be described below.

Firstly, as shown in FIGS. 3 and 5, the oxygen-containing gas flows from the oxygen-containing gas supply passage 46a into the oxygen-containing gas flow field 58 of the first separator member 30. The oxygen-containing gas moves along the oxygen-containing gas flow field 58 in the direction indicated by the arrow B, and the oxygen-containing gas is supplied to the cathode 40 of the MEA 34.

In the meanwhile, as shown in FIGS. 3 and 6, the fuel gas flows from the fuel gas supply passage 50a into the fuel gas flow field 90 of the second separator member 32. The fuel gas flows along the fuel gas flow field 90 in the direction indicated by the arrow B, and the fuel gas is supplied to the anode 42 of the MEA 34.

Thus, in each of the MEAs 34, the oxygen-containing gas supplied to the cathode 40 and the fuel gas supplied to the anode 42 are partially consumed in the first electrode catalyst layer and the second electrode catalyst layer to perform power generation in electrochemical reactions.

Then, as shown in FIG. 3, the oxygen-containing gas supplied to the cathode 40, and partially consumed at the cathode 40 is discharged along the oxygen-containing gas discharge passage 46b in the direction indicated by the arrow A. Likewise, the fuel gas supplied to the anode 42, and partially consumed at the anode 42 is discharged along the fuel gas discharge passage 50b in the direction indicated by the arrow A.

Further, the coolant supplied to the coolant supply passage 48a flows into the coolant flow field 118 formed between the first separator member 30 and the second separator member 32, and then, the coolant flows in the direction indicated by the arrow B. After the coolant cools the MEA 34, the coolant is discharged from the coolant discharge passage 48b.

Next, a method of producing the fuel cell stack 10 according to the embodiment will be described below.

Figure 11:
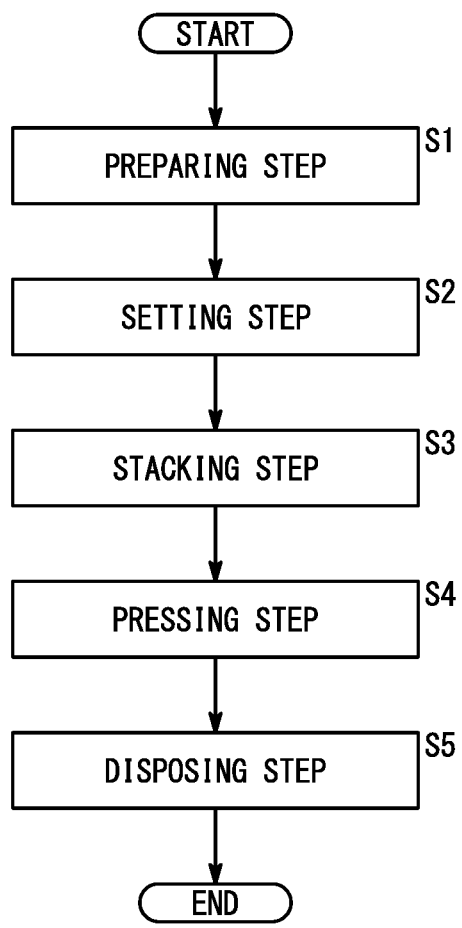
FIG. 11 is a flow chart showing a method of producing the fuel cell stack in FIG. 1.

As shown in FIG. 11, the method of producing the fuel cell stack 10 includes a preparing step, a setting step, a stacking step, a pressing step, and a disposing step. Firstly, in the preparing step (step S1), only the first case member 148 is fixed to one end of the peripheral wall case 134 (see FIG. 12). That is, the second end plate 138 is not attached to the peripheral wall case 134. Further, the second case member 150 is not attached to the first case member 148.

Figure 12:
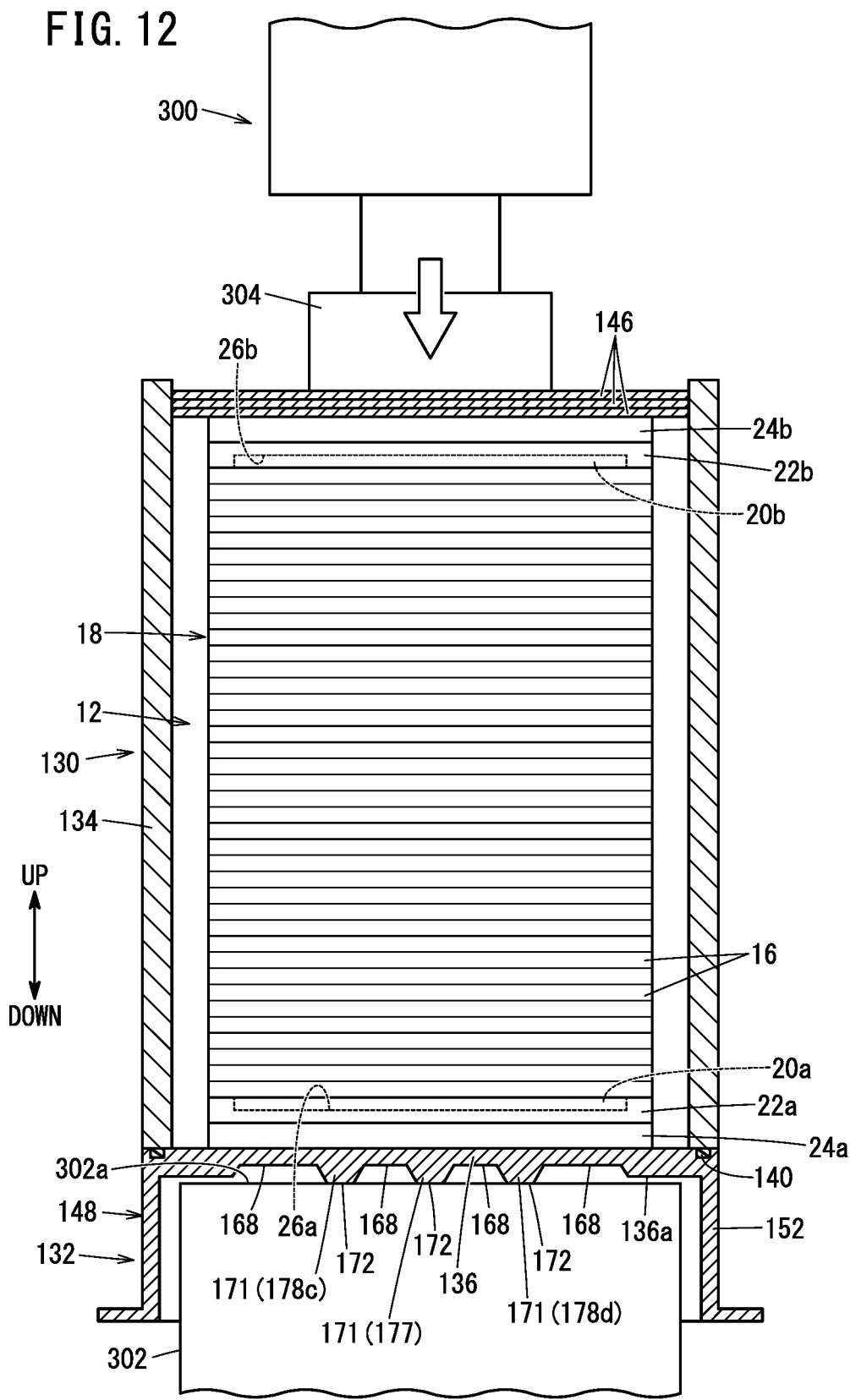
FIG. 12 is a first view showing a pressing step.

Then, in the setting step (step S2), in the state where the surface 136a of the first end plate 136 is oriented vertically downward, the first case member 148 is set in a support jig 302 of a pressure applying apparatus 300 (see FIG. 12). At this time, the support surface 172 of each of the projections 171 contacts a flat pressure receiving surface 302a of the support jig 302.

Thereafter, in the stacking step (step S3), the first outer insulating plate 24a, the first inner insulating plate 22a, the first terminal plate 20a, the plurality of power generation cells 16 (cell stack body 18), the second terminal plate 20b, the second inner insulating plate 22b, the second outer insulating plate 24b, and the plurality of shim plates 146 are stacked together successively in the peripheral wall case 134 to form the cell stack body 18.

Thereafter, in the pressing step (step S4), load aging for pressing the shim plates 146 downward by a pressing member 304 is performed. Stated otherwise, in the pressing step, the cell stack body 18 is pressed toward the first end plate 136. Then, the compression load is applied to the cell stack body 18. In the pressing step, the compression load applied to the cell stack body 18 is larger than the compression load applied to the cell stack body 18 during operation of the fuel cell stack 10. Further, in the pressing step, the desired compression load is applied to the cell stack body 18 repeatedly. Further, in the pressing step, for example, the magnitude of the compression load applied to the cell stack body 18, the number of times the compression load is applied to the cell stack body 18, and the timing of the compression load is applied to the cell stack body 18 can be changed as necessary.

Figure 13:
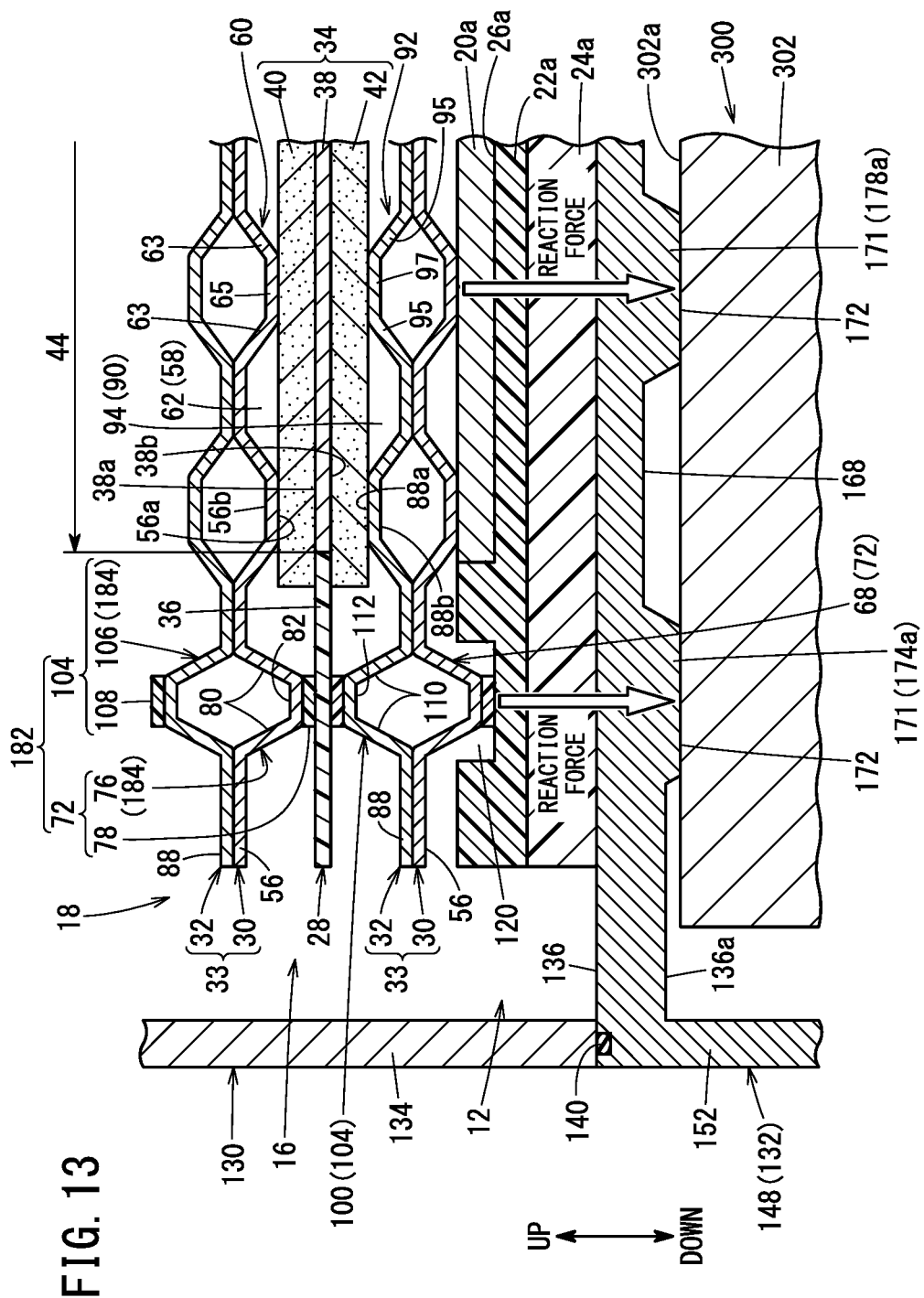
FIG. 13 is a second view showing the pressing step.
Figure 14:
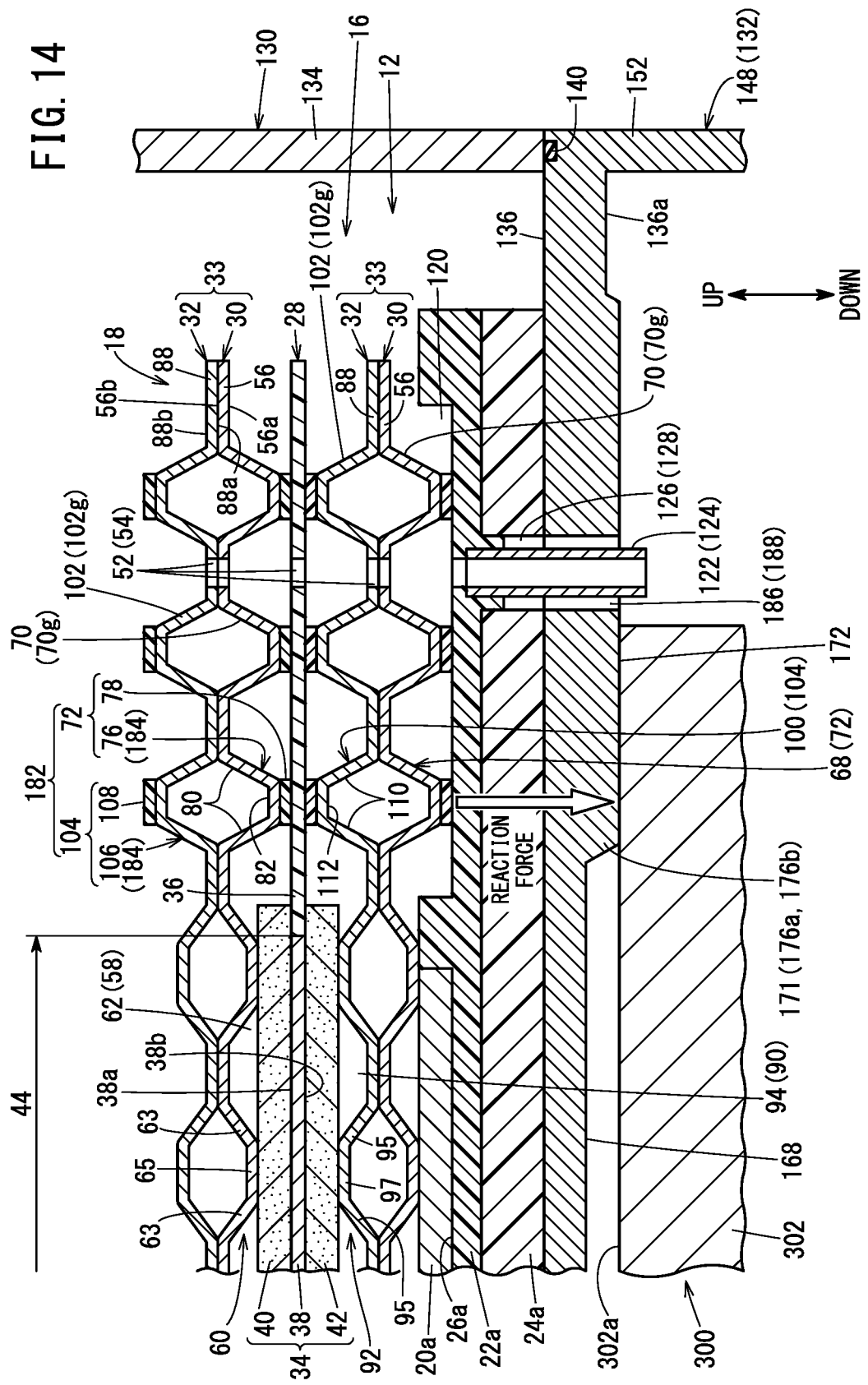
FIG. 14 is a third view showing the pressing step.

In the pressing step, when the pressing load is applied to the cell stack body 18, as shown in FIGS. 13 and 14, the first flow field ridges 60, the second flow field ridges 92, and the seal bead 184 are deformed elastically. As a result, relatively large reaction force is applied from the cell stack body 18 to the first end plate 136 in parts overlapped with the power generation area 44 and the flow field seal 182 as viewed in the stacking direction (direction indicated by the arrow A).

Then, the reaction force applied from the flow field seal 182 toward the first end plate 136 is received by the pressure receiving surface 302a of the support jig 302 through the first projections 174a, 174b, and the second projections 176a, 176b. Further, as shown in FIG. 13, the reaction force applied from the power generation area 44 toward the first end plate 136 is received by the pressure receiving surface 302a of the support jig 302 through the outer peripheral projections 178a, 178b, 178c, 178d, and the central projection 177. Therefore, it is possible to suppress deformation of the first end plate 136 by the reaction force from the cell stack body 18.

By performing the pressing step (load aging) in this manner, it is possible to preliminarily deform the first flow field ridges 60, the second flow field ridges 92, and the seal bead 184 by a desired amount beforehand. Thus, it is possible to reduce settling of the first flow field ridges 60, the second flow field ridges 92, and the seal bead 184 during operation.

After finishing the pressing step, the pressing member 304 is removed, and in the disposing step (step S5), the second end plate 138 is fixed to the peripheral wall case 134 using the bolts 142 (see FIG. 2). At this time, the support surfaces 180 of the plurality of projections 179 of the second end plate 138 are pressed toward the first end plate 136. In this manner, it is possible to suppress deformation of the second end plate 138, and efficiently fix the second end plate 138 to the peripheral wall case 134 using the bolts 142. By the disposing step, in this manner, a predetermined compression load is applied to the cell stack body 18. Further, in the state where the fuel cell auxiliary devices 131 are placed in the first case member 148, the second case member 150 is fixed to the first case member 148 using the bolts 162 (see FIG. 2). In this manner, production of the fuel cell stack 10 is completed.

In this case, the fuel cell stack 10 and the method of producing the fuel cell stack 10 according to the embodiment of the present invention offer the following advantages.

In the embodiment of the present invention, the plurality of projections 171 having the support surfaces 172 oriented in the stacking direction (direction indicated by the arrow A) are provided on the surface 136a of the first end plate 136 opposite to the cell stack body 18. The plurality of projections 171 are overlapped with the flow field seal 182 as viewed in the stacking direction. The support surfaces 172 of the plurality of projections 171 are positioned on the single plane surface (same plane surface) perpendicular to the stacking direction.

In the structure, at the time of applying the compression load to the cell stack body 18, in the state where the support surfaces 172 of the plurality of projections 171 provided on the first end plate 136 are brought into contact with the pressure receiving surface 302a of the support jig 302 of the pressure applying apparatus 300, it is possible to press the cell stack body 18 toward the first end plate 136. As a result, the reaction force applied from the flow field seal 182 of the cell stack body 18 to the first end plate 136 (restoring force of the elastically deformed seal bead 184) can be received efficiently by the pressure receiving surface 302a of the support jig 302 through the plurality of projections 171. Therefore, it is possible to suppress deformation of the first end plate 136. Further, in this case, since there is no need to produce the first end plate 136 to have a large thickness as a whole, it is possible to reduce the size and the weight of the fuel cell stack 10.

As viewed in the stacking direction, the plurality of projections 171 include the first projections 174a, 174b and the second projections 176a, 176b positioned on both sides of the power generation area 44.

In the structure, the reaction force applied from the flow field seal 182 to the first end plate 136 can be received with good balance by the pressure receiving surface 302a of the support jig 302 through the first projections 174a, 174b and the second projections 176a, 176b.

The plurality of (two) first projections 174a, 174b are disposed with a space, and the plurality of (two) second projections 176a, 176b are disposed with a space.

In the structure, the reaction force applied from the flow field seal 182 to the first end plate 136 can be received by the pressure receiving surface 302a of the support jig 302 through the plurality of first projections 174a, 174b, and the plurality of second projections 176a, 176b with even better balance.

The first projections 174a, 174b are formed integrally with the first end plate 136, and are formed to be solid (not hollow).

In the structure, it is possible to effectively increase the rigidity of the first end plate 136 by the first projections 174a, 174b.

The second projections 176a, 176b are positioned below the power generation area 44. The through holes 186, 188 are formed in the second projections 176a, 176b for discharging the water produced in power generation of the plurality of power generation cells 16 to the outside.

In the structure, it is possible to utilize the projections having the through holes 186, 188 for drainage as the second projections 176a, 176b. That is, since there is no need to provide any projections having the through holes for drainage in addition to the second projections 176a, 176b, it is possible to achieve reduction in the size and the weight of the fuel cell stack 10.

The plurality of projections 179 of the second end plate 138 are overlapped with the flow field seal 182 as viewed in the stacking direction, and the support surfaces 180 of the plurality of projections 179 of the second end plate 138 are positioned on a single plane surface perpendicular to the stacking direction.

In the structure, while pressing the support surfaces 180 of the plurality of projections 179 of the second end plate 138 toward the first end plate 136, it is possible to fix the second end plate 138 to the end of the cell stack body 18 in the stacking direction. Thus, it is possible to suppress deformation of the second end plate 138 by the reaction force from the flow field seal 182, and fix the second end plate 138 efficiently.

In the embodiment of the present invention, the plurality of projections 171 are overlapped with the power generation area 44 as viewed in the stacking direction. The support surfaces 172 of the plurality of projections 171 are positioned on the single plane surface (same plane surface) perpendicular to the stacking direction.

In the structure, when the compression load is applied to the cell stack body 18, the reaction force applied from the power generation area 44 of the cell stack body 18 to the first end plate 136 (restoring force of the elastically deformed first flow field ridges 60 and the second flow field ridges 92) can be received efficiently by the pressure receiving surface 302a of the support jig 302 through the plurality of projections 171. Therefore, it is possible to suppress deformation of the first end plate 136. Further, in this case, since there is no need to produce the first end plate 136 to have a large thickness as a whole, it is possible to reduce the size and the weight of the fuel cell stack 10.

The power generation area 44 has a quadrangular shape. The plurality of projections 171 include a plurality of outer peripheral projections 178a, 178b, 178c, 178d overlapped with the central portion of each of the sides of the power generation area 44, as viewed in the stacking direction.

In the structure, the reaction force applied from the power generation area 44 to the first end plate 136 can be received with good balance by the pressure receiving surface 302a of the support jig 302 through the plurality of outer peripheral projections 178a, 178b, 178c, 178d.

The plurality of projections 171 include the central projection 177 overlapped with the center of the power generation area 44 as viewed in the stacking direction.

In the structure, the reaction force applied from the power generation area 44 to the first end plate 136 can be received by the pressure receiving surface 302a of the support jig 302 through the central projection 177.

The plurality of ribs 170 extending in one direction are disposed on the surface 136a of the first end plate 136, and the ribs 170 are spaced from each other. The plurality of projections 171 (the central projection 177 and the outer peripheral projections 178c, 178d) are provided to extend across a gap between the plurality of ribs 170.

In the structure, it is possible to increase the rigidity of the first end plate 136 by the plurality of projections 171 (the central projection 177 and the outer peripheral projections 178c, 178d).

The ends of the plurality of ribs 170 opposite to the cell stack body 18 (in the direction indicated by the arrow A1) are positioned on a side shifted from the support surfaces 172 of the plurality of projections 171 toward the cell stack body 18 (direction indicated by the arrow A2).

In the structure, when the first end plate 136 is set in the support jig 302, it is possible to reliably bring the pressure receiving surface 302a of the support jig 302 into contact with the support surfaces 172 of the plurality of projections 171.

The plurality of projections 179 of the second end plate 138 are overlapped with the power generation area 44 as viewed in the stacking direction, and the support surfaces 180 of the plurality of projections 179 of the second end plate 138 are positioned on a single plane surface perpendicular to the stacking direction.

In the structure, while pressing the support surfaces 180 of the plurality of projections 179 of the second end plate 138 toward the first end plate 136, it is possible to fix the second end plate 138 to the end of the cell stack body 18 in the stacking direction. Therefore, it is possible to suppress deformation of the second end plate 138 by the reaction force from the power generation area 44, and efficiently fix the second end plate 138.

In the embodiment of the present invention, in the setting step, in the state where the surface 136a of the first end plate 136 is oriented downward, the first end plate 136 is set in a manner that the support surfaces 172 of the plurality of projections 171 are brought into contact with the pressure receiving surface 302a of the support jig 302 of the pressing applying apparatus 300. Further, in the pressing step, the cell stack body 18 is pressed against the first end plate 136 by the pressing member 304 of the pressure applying apparatus 300.

In this method, the reaction force applied from the cell stack body 18 (flow field seal 182 or the power generation area 44) to the first end plate 136 can be received efficiently by the pressure receiving surface 302a of the support jig 302 by the plurality of projections 171.

In the disposing step, while the support surfaces 180 of the plurality of projections 179 of the second end plate 138 are pressed against the first end plate 136, the second end plate 138 is fixed.

In this method, it is possible to suppress deformation of the second end plate 138, and efficiently fix the second end plate 138.

The fuel cell stack 10 is not limited to the above structure. The first projections 174a, 174b and the second projections 176a, 176b may be provided at positions adjacent to the flow field seals 182 (the first projections 174a, 174b and the second projections 176a, 176b may not be overlapped with the flow field seals 182) as viewed in the direction indicated by the arrow A. Also in this case, at the time of applying the compression load to the cell stack body 18, the reaction force applied from the flow field seal 182 to the first end plate 136 can be received efficiently by the pressure receiving surface 302a of the support jig 302 through the first projections 174a, 174b, and the second projections 176a, 176b. The plurality of projections 179 may be provided at positions adjacent to the flow field seals 182 (the plurality of projections 179 may not be overlapped with the flow field seal 182) as viewed in the stacking direction (direction indicated by the arrow A).

The number, the position, the size, and the shape of the plurality of projections 171, 179 are not limited to the above described embodiment, and can be changed as necessary. Specifically, the fuel cell stack 10 may have a first case member 148a according to a modified embodiment shown in FIG. 15 instead of the above described first case member 148.

As shown in FIG. 15, in the first case member 148a, the four outer peripheral projections 178a, 178b, 178c, 178d are overlapped with the corners of the power generation area 44 as viewed in the direction indicated by the arrow A, respectively. In this case, preferably, the two first projections 174a, 174b are remote from the outer peripheral projections 178c, 178d located at upper positions, at suitable distance. Even in the case of the first case member 148a having the above structure, the same advantages as in the case of the first case member 148 as described above are obtained.

The present invention is not limited to the above described embodiment. Various modifications may be made without deviating from the gist of the present invention.

The above embodiment will be summarized as follows:

The above embodiment discloses the fuel cell stack (10) including the cell stack body (18) including the plurality of stacked power generation cells (16), the power generation cells each including the membrane electrode assembly (34) and the separator members (30, 32) disposed on both sides of the membrane electrode assembly, the membrane electrode assembly including the electrolyte membrane (38), and the electrodes (40, 42) disposed on both sides of the electrolyte membrane, and the end plate (136) configured to cover the cell stack body from a stacking direction in which the plurality of power generation cells are stacked together, a compression load being applied to the cell stack body in the stacking direction, wherein the separator member includes a separator body (56, 88) in the form of a metal plate, the separator body is provided with a flow field seal (182) configured to extend around a power generation area (44) of the membrane electrode assembly and prevent leakage of a reactant gas, the flow field seal includes the seal bead (184) formed integrally with the separator body and protruding from the separator body in a manner that the seal bead is deformed elastically by the compression load, the plurality of projections (171) having the support surfaces (172) oriented in the stacking direction are provided on the surface (136*a*) of the end plate opposite to the cell stack body, the plurality of projections are provided at positions that are overlapped with, or adjacent to the flow field seal as viewed in the stacking direction, and the support surfaces of the plurality of projections are positioned on a single plane surface perpendicular to the stacking direction.

In the fuel cell stack, as viewed in the stacking direction, the plurality of projections may include the first projection (174*a*, 174*b*) and the second projection (176*a*, 176*b*) positioned on both sides of the power generation area.

In the above fuel cell stack, a plurality of the first projections may be disposed with a space, and a plurality of the second projections may be disposed with a space.

In the above fuel cell stack, the first projection may be formed integrally with the end plate, and formed to be solid.

In the above fuel cell stack, the second projection may be provided below the power generation area, and the second projection may have a through hole (186, 188) configured to discharge the water produced in power generation of the plurality of power generation cells to the outside of the fuel cell stack.

The above fuel cell stack may include a peripheral wall (152) protruding from an outer peripheral portion of the end plate toward a side opposite to the cell stack body.

In the above fuel cell stack, the support surfaces of the plurality of projections may be positioned on a side close to the cell stack body in comparison with a protruding end of the peripheral wall.

In the fuel cell stack, the end plate may be the first end plate, the fuel cell stack may include the second end plate (138) configured to cover the cell stack body from a side opposite to the first end plate, the plurality of projections (179) may be provided on the surface (138*a*) of the second end plate opposite to the cell stack body, the projections having the support surfaces (180) oriented in the stacking direction, the plurality of projections of the second end plate may be provided at positions that are overlapped with, or adjacent to the flow field seal as viewed in the stacking direction, and the support surfaces of the plurality of projections of the second end plate may be positioned on the single plane surface perpendicular to the stacking direction.

The embodiment of the present invention discloses the fuel cell stack including the cell stack body including the plurality of stacked power generation cells, the power generation cells each including the membrane electrode assembly and separator members disposed on both sides of the membrane electrode assembly, the membrane electrode assembly including the electrolyte membrane, and the electrodes disposed on both sides of the electrolyte membrane, and the end plate configured to cover the cell stack body from a stacking direction in which the plurality of power generation cells are stacked together, a compression load being applied to the stack body in the stacking direction, wherein the separator member includes the separator body in the form of a metal plate, the separator body is provided with the flow field ridge (60, 92), the flow field ridge being formed integrally with the separator body, and protruding toward the power generation area to form the reactant gas flow field (58, 90) configured to supply a reactant gas to the power generation area of the membrane electrode assembly, the plurality of projections are formed on a surface of the end plate opposite to the cell stack body, the plurality of projections having support surfaces oriented in the stacking direction, the plurality of projections are provided at positions that are overlapped with, or adjacent to the power generation area as viewed in the stacking direction, and the support surfaces of the plurality of projections are positioned on a single plane surface perpendicular to the stacking direction.

In the above fuel cell stack, the power generation area may have a quadrangular shape, and the plurality of projections may include a plurality of outer peripheral projections (178*a* to 178*d*) overlapped with the centers of the sides of the power generation area as viewed in the stacking direction, respectively.

In the above fuel cell stack, the power generation area may have a quadrangular shape, and the plurality of projections may include an outer peripheral projection overlapped with each of corners of the power generation area as viewed in the stacking direction.

In the fuel cell stack, the plurality of projections may include a central projection (177) overlapped with the center of the power generation area as viewed in the stacking direction.

In the above fuel cell stack, the plurality of ribs (170) may be disposed on the surface of the end plate, and the ribs may extend in one direction and may be spaced from each other, and the plurality of projections may be provided to extend across a gap between the plurality of ribs.

In the above fuel cell stack, ends of the plurality of ribs opposite to the cell stack body may be positioned on a side close to the cell stack body in comparison with the support surfaces of the plurality of projections.

In the fuel cell stack, the end plate may be the first end plate, the fuel cell stack may include the second end plate configured to cover the cell stack body from a side opposite to the first end plate, the plurality of projections may be provided on the surface of the second end plate opposite to the cell stack body, the projections having support surfaces oriented in the stacking direction, the plurality of projections of the second end plate may be provided at positions that are overlapped with, or adjacent to the power generation area as viewed in the stacking direction, and the support surfaces of the plurality of projections of the second end plate may be positioned on the single plane surface perpendicular to the stacking direction.

The above embodiment discloses a method of producing a fuel cell stack which is the fuel cell stack as described above, the method including setting the end plate in the state where the surface of the end plate is oriented downward, in a manner that the support surfaces of the plurality of projections contact a pressure receiving surface (302*a*) of a support jig (302) of a pressure applying apparatus (300), stacking the plurality of power generation cells on the end plate to form the cell stack body, pressing the cell stack body toward the end plate by a pressing member (304) of the pressure applying apparatus, and disposing another end plate in addition to the end plate, on a side of the cell stack body opposite to the end plate in a manner that the compression load is applied to the cell stack body.

In the above method of producing the fuel cell stack, in the disposing, while pressing the support surfaces of the plurality of projections of the second end plate against the first end plate, the second end plate may be fixed.

What is claimed is:

1. A fuel cell stack comprising:
a cell stack body including a plurality of stacked power generation cells, the power generation cells each including a membrane electrode assembly and separator members disposed on both sides of the membrane electrode assembly, the membrane electrode assembly including an electrolyte membrane, and electrodes disposed on both sides of the electrolyte membrane; and
an end plate configured to cover the cell stack body from a stacking direction in which the plurality of power generation cells are stacked together, a compression load being applied to the cell stack body in the stacking direction,
wherein the separator member includes a separator body in a form of a metal plate,
the separator body is provided with a flow field seal configured to extend around a power generation area of the membrane electrode assembly and prevent leakage of a reactant gas,
the flow field seal includes a seal bead formed integrally with the separator body and protruding from the separator body in a manner that the seal bead is deformed elastically by the compression load,
a plurality of projections having support surfaces oriented in the stacking direction are provided on a surface of the end plate opposite to the cell stack body,
the plurality of projections are provided at positions that are overlapped with, or adjacent to the flow field seal as viewed in the stacking direction, and
the support surfaces of the plurality of projections are positioned on a single plane surface perpendicular to the stacking direction.

2. The fuel cell stack according to claim 1, wherein, as viewed in the stacking direction, the plurality of projections include a first projection and a second projection positioned on both sides of the power generation area.

3. The fuel cell stack according to claim 2, wherein a plurality of the first projections are disposed with a space, and
a plurality of the second projections are disposed with a space.

4. The fuel cell stack according to claim 2, wherein the first projection is formed integrally with the end plate, and formed to be solid.

5. The fuel cell stack according to claim 2, wherein the second projection is provided below the power generation area, and
the second projection has a through hole configured to discharge water produced in power generation of the plurality of power generation cells, to outside of the fuel cell stack.

6. The fuel cell stack according to claim 1, further comprising a peripheral wall protruding from an outer peripheral portion of the end plate toward a side opposite to the cell stack body.

7. The fuel cell stack according to claim 6, wherein the support surfaces of the plurality of projections are positioned on a side close to the cell stack body in comparison with a protruding end of the peripheral wall.

8. The fuel cell stack according to claim 1, wherein the end plate is a first end plate,
the fuel cell stack includes a second end plate configured to cover the cell stack body from a side opposite to the first end plate,
a plurality of projections are provided on a surface of the second end plate opposite to the cell stack body, the projections having support surfaces oriented in the stacking direction,
the plurality of projections of the second end plate are provided at positions that are overlapped with, or adjacent to the flow field seal as viewed in the stacking direction, and
the support surfaces of the plurality of projections of the second end plate are positioned on a single plane surface perpendicular to the stacking direction.

9. A fuel cell stack comprising:
a cell stack body including a plurality of stacked power generation cells, the power generation cells each including a membrane electrode assembly and separator members disposed on both sides of the membrane electrode assembly, the membrane electrode assembly including an electrolyte membrane, and electrodes disposed on both sides of the electrolyte membrane; and
an end plate configured to cover the cell stack body from a stacking direction in which the plurality of power generation cells are stacked together, a compression load being applied to the cell stack body in the stacking direction,
wherein the separator member includes a separator body in a form of a metal plate,
the separator body is provided with a flow field ridge, the flow field ridge being formed integrally with the separator body, and protruding toward the power generation area to form a reactant gas flow field configured to supply a reactant gas to the power generation area of the membrane electrode assembly,
a plurality of projections are formed on a surface of the end plate opposite to the cell stack body, the plurality of projections having support surfaces oriented in the stacking direction,
the plurality of projections are provided at positions that are overlapped with, or adjacent to the power generation area as viewed in the stacking direction, and
the support surfaces of the plurality of projections are positioned on a single plane surface perpendicular to the stacking direction.

10. The fuel cell stack according to claim 9, wherein the power generation area has a quadrangular shape, and
the plurality of projections includes a plurality of outer peripheral projections overlapped with centers of sides of the power generation area as viewed in the stacking direction, respectively.

11. The fuel cell stack according to claim 9, wherein the power generation area has a quadrangular shape, and
the plurality of projections include an outer peripheral projection overlapped with each of corners of the power generation area as viewed in the stacking direction.

12. The fuel cell stack according to claim 9, wherein the plurality of projections include a central projection overlapped with a center of the power generation area as viewed in the stacking direction.

13. The fuel cell stack according to claim 9, wherein a plurality of ribs are disposed on the surface of the end plate, and the ribs extend in one direction, and are spaced from each other, and
the plurality of projections are provided to extend across a gap between the plurality of ribs.

14. The fuel cell stack according to claim 13, wherein ends of the plurality of ribs opposite to the cell stack body are positioned on a side close to the cell stack body in comparison with the support surfaces of the plurality of projections.

15. The fuel cell stack according to claim 9, wherein the end plate is a first end plate,
the fuel cell stack includes a second end plate configured to cover the cell stack body from a side opposite to the first end plate,
a plurality of projections are provided on a surface of the second end plate opposite to the cell stack body, the projections having support surfaces oriented in the stacking direction,
the plurality of projections of the second end plate are provided at positions that are overlapped with, or adjacent to the power generation area as viewed in the stacking direction, and
the support surfaces of the plurality of projections of the second end plate are positioned on a single plane surface perpendicular to the stacking direction.

16. A method of producing a fuel cell stack, the fuel cell stack comprising:
a cell stack body including a plurality of stacked power generation cells, the power generation cells each including a membrane electrode assembly and separator members disposed on both sides of the membrane electrode assembly, the membrane electrode assembly including an electrolyte membrane, and electrodes disposed on both sides of the electrolyte membrane; and
an end plate configured to cover the cell stack body from a stacking direction in which the plurality of power generation cells are stacked together, a compression load being applied to the cell stack body in the stacking direction,
wherein the separator member includes a separator body in a form of a metal plate,
the separator body is provided with a flow field seal configured to extend around a power generation area of the membrane electrode assembly and prevent leakage of a reactant gas,
the flow field seal includes a seal bead formed integrally with the separator body and protruding from the separator body in a manner that the seal bead is deformed elastically by the compression load,
a plurality of projections having support surfaces oriented in the stacking direction are provided on a surface of the end plate opposite to the cell stack body,
the plurality of projections are provided at positions that are overlapped with, or adjacent to the flow field seal as viewed in the stacking direction, and
the support surfaces of the plurality of projections are positioned on a single plane surface perpendicular to the stacking direction,
the method comprising:
setting the end plate in a state where the surface of the end plate is oriented downward, in a manner that the support surfaces of the plurality of projections contact a pressure receiving surface of a support jig of a pressure applying apparatus;
stacking the plurality of power generation cells on the end plate to form the cell stack body;
pressing the cell stack body toward the end plate by a pressing member of the pressure applying apparatus; and
disposing another end plate in addition to the end plate, on a side of the cell stack body opposite to the end plate in a manner that the compression load is applied to the cell stack body.

17. The method of producing the fuel cell stack according to claim 16, wherein the end plate is a first end plate,
the fuel cell stack includes a second end plate as the another end plate configured to cover the cell stack body from a side opposite to the first end plate,
a plurality of projections are provided on a surface of the second end plate opposite to the cell stack body, the projections having support surfaces oriented in the stacking direction,
the plurality of projections of the second end plate are provided at positions that are overlapped with, or adjacent to the flow field seal as viewed in the stacking direction, and
the support surfaces of the plurality of projections of the second end plate are positioned on a single plane surface perpendicular to the stacking direction, and
wherein in the disposing, while pressing the support surfaces of the plurality of projections of the second end plate against the first end plate, the second end plate is fixed.

18. A method of producing a fuel cell stack, the fuel cell stack comprising:
a cell stack body including a plurality of stacked power generation cells, the power generation cells each including a membrane electrode assembly and separator members disposed on both sides of the membrane electrode assembly, the membrane electrode assembly including an electrolyte membrane, and electrodes disposed on both sides of the electrolyte membrane; and
an end plate configured to cover the cell stack body from a stacking direction in which the plurality of power generation cells are stacked together, a compression load being applied to the cell stack body in the stacking direction,
wherein the separator member includes a separator body in a form of a metal plate,
the separator body is provided with a flow field ridge, the flow field ridge being formed integrally with the separator body, and protruding toward the power generation area to form a reactant gas flow field configured to supply a reactant gas to the power generation area of the membrane electrode assembly,
a plurality of projections are formed on a surface of the end plate opposite to the cell stack body, the plurality of projections having support surfaces oriented in the stacking direction,
the plurality of projections are provided at positions that are overlapped with, or adjacent to the power generation area as viewed in the stacking direction, and
the support surfaces of the plurality of projections are positioned on a single plane surface perpendicular to the stacking direction,
the method comprising:
setting the end plate in a state where the surface of the end plate is oriented downward, in a manner that the support surfaces of the plurality of projections contact a pressure receiving surface of a support jig of a pressure applying apparatus;
stacking the plurality of power generation cells on the end plate to form the cell stack body;
pressing the cell stack body toward the end plate by a pressing member of the pressure applying apparatus; and
disposing another end plate in addition to the end plate, on a side of the cell stack body opposite to the end plate in a manner that the compression load is applied to the cell stack body.

19. The method of producing the fuel cell stack according to claim 18, wherein the end plate is a first end plate, the fuel cell stack includes a second end plate as the another end plate configured to cover the cell stack body from a side opposite to the first end plate, a plurality of projections are provided on a surface of the second end plate opposite to the cell stack body, the projections having support surfaces oriented in the stacking direction, the plurality of projections of the second end plate are provided at positions that are overlapped with, or adjacent to the power generation area as viewed in the stacking direction, and the support surfaces of the plurality of projections of the second end plate are positioned on a single plane surface perpendicular to the stacking direction, and wherein in the disposing, while pressing the support surfaces of the plurality of projections of the second end plate against the first end plate, the second end plate is fixed.

* * * * *